(12) United States Patent
Song et al.

(10) Patent No.: US 11,588,791 B2
(45) Date of Patent: Feb. 21, 2023

(54) METHOD AND APPARATUS FOR TRUSTED SERVICE MANAGEMENT

(71) Applicant: Alibaba Group Holding Limited, Grand Cayman (KY)

(72) Inventors: Yinan Song, Hangzhou (CN); Fei Shi, Hangzhou (CN)

(73) Assignee: Alibaba Group Holding Limited

( * ) Notice: Subject to any disclaimer, the term of this patent is extended or adjusted under 35 U.S.C. 154(b) by 280 days.

(21) Appl. No.: 16/932,561

(22) Filed: Jul. 17, 2020

(65) Prior Publication Data

US 2020/0351247 A1 Nov. 5, 2020

Related U.S. Application Data

(63) Continuation of application No. PCT/CN2019/070324, filed on Jan. 4, 2019.

(30) Foreign Application Priority Data

Jan. 18, 2018 (CN) .......................... 201810048460.X

(51) Int. Cl.
*H04L 9/40* (2022.01)

(52) U.S. Cl.
CPC ...... *H04L 63/0272* (2013.01); *H04L 63/0876* (2013.01); *H04L 63/102* (2013.01)

(58) Field of Classification Search
CPC ............. H04L 63/0272; H04L 63/0876; H04L 63/102
See application file for complete search history.

(56) References Cited

U.S. PATENT DOCUMENTS 9,208,483 B2 12/2015 Corda et al.
9,716,688 B1 * 7/2017 Emelyanov ........... H04L 67/288
(Continued)

FOREIGN PATENT DOCUMENTS

AU 2016203535 A1 6/2016
CN 102833817 A 12/2012
(Continued)

OTHER PUBLICATIONS

Translation of International Search Report for corresponding PCT Application No. PCT/CN2019/070324 dated Mar. 26, 2019, a counterpart foreign application for U.S. Appl. No. 16/932,561, 2 pages.

(Continued)

*Primary Examiner* — Catherine Thiaw
(74) *Attorney, Agent, or Firm* — Lee & Hayes, P.C.

(57) ABSTRACT

Method and apparatus for trusted service management are disclosed. The method includes obtaining an identification identifier and address information of a computing unit; obtaining a mapping table for the identification identifier and the address information of the computing unit; initiating a trusted service request message to a server that provides trusted service management using the identification identifier of the computing unit; and receiving a corresponding trusted service response message, and transmitting the trusted service response message to the computing unit according to the mapping table. This thereby solves the problem that some terminals cannot carry all services logics for communications between a TSM Agent and a TSM Server.

17 Claims, 11 Drawing Sheets

(56) References Cited

U.S. PATENT DOCUMENTS

| | | |
|---|---|---|
| 9,735,968 B2 | 8/2017 | Thom et al. |
| 9,979,703 B2 | 5/2018 | Warnez et al. |
| 2004/0153646 A1 | 8/2004 | Smith |
| 2005/0120219 A1 | 6/2005 | Munetoh et al. |
| 2007/0162394 A1* | 7/2007 | Zager .......... H04L 51/212 705/51 |
| 2008/0046581 A1 | 2/2008 | Molina et al. |
| 2010/0146295 A1 | 6/2010 | Proudler |
| 2011/0161672 A1 | 6/2011 | Martinez et al. |
| 2012/0163589 A1 | 6/2012 | Johnson et al. |
| 2012/0172026 A1* | 7/2012 | Kwon .......... G06Q 20/354 455/419 |
| 2013/0151400 A1 | 6/2013 | Makhotin et al. |
| 2013/0198086 A1 | 8/2013 | Mardikar |
| 2013/0304651 A1 | 11/2013 | Smith |
| 2014/0297524 A1* | 10/2014 | Ravindranath ...... G06Q 20/322 705/41 |
| 2014/0351806 A1 | 11/2014 | Gargiulo |
| 2016/0275504 A1* | 9/2016 | Koh .......... G06Q 20/325 |
| 2017/0357963 A1 | 12/2017 | Khan et al. |
| 2019/0318341 A1 | 10/2019 | Makhotin et al. |

FOREIGN PATENT DOCUMENTS

| | | |
|---|---|---|
| CN | 103270526 A | 8/2013 |
| CN | 104115175 A | 10/2014 |
| CN | 106796519 A | 5/2017 |

OTHER PUBLICATIONS

Translation of Written Opinion for corresponding PCT Application No. PCT/CN2019/070324 dated Mar. 26, 2019, a counterpart foreign application for U.S. Appl. No. 16/932,561, 4 pages.

Translation of CN Office Action from Corresponding CN Application No. 201810048460.X dated May 19, 2021, a counterpart foreign application for U.S. Appl. No. 16/932,561, 12 pages.

Extended European Search Report dated Aug. 20, 2021 for European Patent Application No. 19741886.6, 13 pages.

Translation of CN Office Action from Corresponding CN Application No. 201810048460.X dated Jan. 30, 2022, a counterpart foreign application for U.S. Appl. No. 16/932,561, 10 pages.

Translation of CN Search Report from Corresponding CN Application No. 201810048460.X dated Jan. 26, 2022, a counterpart foreign application for U.S. Appl. No. 16/932,561, 1 page.

* cited by examiner

METHOD AND APPARATUS FOR TRUSTED SERVICE MANAGEMENT

CROSS REFERENCE TO RELATED PATENT APPLICATIONS

This application claims priority to and is a continuation of PCT Patent Application No. PCT/CN2019/070324 filed on 4 Jan. 2019, and is related to and claims priority to Chinese Application No. 201810048460.X, filed on 18 Jan. 2018 and entitled "Method and Apparatus for Trusted Service Management," which are hereby incorporated by reference in their entirety.

TECHNICAL FIELD

The present disclosure relates to the field of the Internet, and particularly to methods and apparatuses for trusted service management, methods and apparatuses for requesting trusted service management, and trusted service management systems.

BACKGROUND

With the development of Internet technology and mobile communication technology, banks, transportation operators, financial institutions, and other digital service providers provide users with services through Trusted Server Management (or TSM) platforms to replace traditional counters. The so-called TSM platform refers to a platform that performs a fast, efficient and safe air management of SE (Secure Element) smart card chips that comply with international GP (Global Platform) specifications, including air card issuance, SE security domain management, key life cycle management, two-way authentication of TSM server and SE card, mobile payment management, etc. The so-called GP refers to a global policymaker of unified standards for security infrastructure based on security chips. Such international standards organization develops, enacts, and publishes technical standards for security chips to promote deployments of trusted services.

In existing applications, a SE chip cooperates with a TSM platform to provide a complete set of business solutions of highly secure trusted services, which are mainly used in mobile financial projects. For example, bank service providers provide newly registered mobile users with instant solutions, Alipay, etc. In addition to being widely used in the fields of mobile payment and finance, a wide range of applications in the field of the Internet of Things is foreseeable in the future, which are used for safely storing some sensitive data in complex and fragmented Internet of Things terminal devices, such as keys, certificates, core data, and other information. An existing technical solution is an end-to-end solution of a service end and a device end located in the cloud. In other words, a SE chip is embedded or integrated in a mobile-phone-type portable device or other smart device, providing hardware-level security for a smart device end. A TSM agent (TSM Agent) is deployed on the smart device end, and is responsible for data communications between the SE chip embedded or integrated in the smart device end and a service end of the TSM platform (a TSM Server) to complete trusted service management.

Terminals in the field of the Internet of Things are presented in a variety of forms, and systems tend to be of low-end. With the development of a variety of terminal devices and different versions, fragmentation of a system has become more and more serious. The so-called fragmentation refers to a situation in which new versions are continued to roll out while old versions coexist for a long time. Therefore, when using an existing end-to-end technical solution of a service end and a device end to provide trusted service management, a problem that some terminals cannot carry all service logics for communications between a TSM Agent and a TSM Server exists.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides a method for trusted service management to solve the problem that some terminals cannot carry all services logics for communications between a TSM Agent and a TSM Server.

The present disclosure also provides a method for requesting trusted service management.

The present disclosure also provides an apparatus for trusted service management.

The present disclosure also provides an apparatus for requesting trusted service management.

The present disclosure also provides a trusted service management system.

The present disclosure provides a method for trusted service management, which includes:

obtaining an identification identifier and address information of a computing unit;

obtaining a mapping table for the identification identifier and the address information of the computing unit;

initiating a trusted service request message to a server that provides trusted service management using the identification identifier of the computing unit; and receiving a corresponding trusted service response message, and transmitting the trusted service response message to the computing unit according to the mapping table.

In implementations, the method for trusted service management is performed based on a gateway.

In implementations, the gateway is a WIFI gateway.

In implementations, the computing unit is a secure element or a secure device embedded with a secure element.

In implementations, the method further includes receiving an execution result returned by the computing unit, and sending the execution result to the server that provides the trusted service management.

In implementations, transmitting the trusted service response message to the computing unit includes: transmitting the trusted service response message to the computing unit in a broadcast mode.

In implementations, the identification identifier is a production life cycle (CPLC) of a secure element of the computing unit.

In implementations, the address information is a MAC and/or an IP of the secure element or the secure device.

In implementations, obtaining the identification identifier and the address information of the computing unit includes the following processing:

receiving a request from a requesting party, and performing an operation of connection and gateway authentication on the requesting party;

recording address information of the requesting party is and querying whether the requesting party is a secure element or a secure device if the authentication is passed;

sending a request for obtaining the identification identifier of the computing unit if affirmative; and receiving and obtaining the identification identifier of the computing unit.

In implementations, if the address information is a MAC and/or an IP of the secure element or the secure device, the mapping table includes any one of the following correspondence relationships: a correspondence relationship between CPLC and MAC, a correspondence relationship between CPLC and IP, a correspondence relationship among CPLC, MAC and IP.

In implementations, the computing unit is a secure element or a secure device that is able to recognize APDU data specified by a global platform and execute APDU instructions.

In implementations, transmitting the response message to the computing unit in the broadcast mode includes the following processing:

assembling the response message into a broadcast data message according to a packaging protocol; and broadcasting the broadcast data message according to the mapping table, wherein the packaging protocol includes at least relevant information of the following fields: packet header information and APDU data.

In implementations, the packet header information includes at least the following fields: the identification identifier and a length.

In implementations, the packaging protocol includes any of the following fields: reserved bits and a state.

In implementations, the broadcast data message includes one or more data packets assembled according to the packaging protocol.

In implementations, the APDU data includes at least any of the following content information:

life cycle management information, rights management information, key escrow information, authentication information, secure data transmission and processing information, sensitive personal data, and state report information.

In implementations, the server that provides the trusted service management is a SEI-TSM server, wherein the SEI-TSM is a trusted management end that issues secure elements.

In implementations, when the trusted service request message is a security domain creating request APDU, the trusted service response message is a security domain creating instruction APDU.

In implementations, when the execution result returned by the computing unit is a successful creation of a security domain, the following processing is further included after receiving the successful creation of the security domain returned by the computing unit:

initiating an application download request to a SP-TSM using the identification identifier of the computing unit, wherein the SP-TSM is a server of a service provider of the trusted service management.

In implementations, when the trusted service request message is an application download request, the corresponding trusted service response message includes: an APDU formed by assembling and encrypting an application program requested to be downloaded by the SP-TSM, wherein, the APDU is packaged into a broadcast data packet by a gateway according to the packaging protocol, and is sent out in a broadcast form.

In implementations, when the execution result returned by the computing unit is an application installation state report APDU, the following processing is performed after a gateway receives the execution result returned by the computing unit: returning the state report APDU to SP-TSM.

In implementations, when the execution result returned by the computing unit is the application installation state report APDU, the following processing is performed after the gateway returns the state report APDU to the SP-TSM:

sending a personalized request by the gateway to the SP-TSM using the identification identifier of the computing unit, wherein the SP-TSM obtains personalized data according to the personalized request and sends the personalized data to the gateway in an APDU data format, and the gateway collects data and assembles into a broadcast packet, which is broadcasted to the computing unit according to the mapping table.

In implementations, initiating the trusted service request message to the server that provides the trusted service management includes transparently transmitting the received trusted service request message that is initiated by the computing unit.

In implementations, initiating the trusted service request message to the server that provides the trusted service management using the identification identifier of the computing unit includes initiating the trusted service request message in real-time or in a batch manner.

The present disclosure also provides a method for requesting trusted service management, which includes:

reporting address information and identification identifier of a computing unit;

identifying and obtaining a matching data packet according to the identification identifier from a received data message, and parsing out trusted service data from the data packet; and executing an instruction included in the trusted service data, and returning an execution result.

In implementations, the method for requesting trusted service management is performed based on the computing unit, wherein the computing unit is a secure element or a secure device embedded with a secure element.

In implementations, the received data message is a received broadcast data message, wherein the broadcast data message is a data message broadcasted by a gateway accessed by the computing unit.

In implementations, the trusted service data is APDU data specified by a global platform.

In implementations, the identification identifier is CPLC information of a secure element.

In implementations, the address information is a MAC and/or an IP of the secure element or the secure device.

In implementations, before reporting the identification identifier, the method includes:

receiving a message that queries whether it is a computing unit; and reporting the identification of the computing unit if affirmative.

In implementations, identifying and obtaining the matching data packet according to the identification identifier from the received data packet includes the following processing:

recognizing and obtaining, by the secure device, the matching data packet from the received broadcast data message according to the identification identifier thereof.

In implementations, executing the instruction included in the trusted service data, and returning the execution result include:

communicating, within the secure device, with the secure element embedded in the secure device according to APDU data;

decrypting the APDU data through the secure element, executing an APDU instruction obtained after decryption, and encrypting the execution result to form state report APDU data; and reporting the state report APDU data to the gateway through the secure device, and further returning the state report APDU data to a server that provides the trusted service through the gateway.

In implementations, executing a corresponding APDU instruction included in the APDU data, and returning the execution result include the following processing:

decrypting the APDU data by the computing unit, executing the APDU instruction obtained after decryption, and encrypting the execution result to form state report APDU data; and sending the state report APDU data back to the gateway, and then returning the state report APDU data to a server that provides the trusted service through the gateway.

In implementations, the corresponding APDU instruction included in the APDU data includes any of the following:

an instruction for creating a security domain APDU provided by a SEI-TSM server;

an application program APDU delivered by the SP-TSM; or personalized data APDU provided by the SP-TSM.

The present disclosure also provides an apparatus for trusted service management, which includes:

an identification identifier and address acquisition unit configured to obtain an identification identifier and address information of a computing unit;

a mapping unit configured to obtain a mapping table for the identification identifier and the address information of the computing unit;

a service-side request unit configured to initiate a trusted service request message to a server that provides trusted service management using the identification identifier of the computing unit; and a service-side response processing unit configured to receive a corresponding trusted service response message, and transmit the trusted service response message to the computing unit according to the mapping table.

The present disclosure also provides an apparatus for requesting trusted service management, which includes:

an identification identifier and address reporting unit configured to report address information and an identification identifier of a computing unit;

a data receiving unit configured to identify and obtain a matching data packet according to the identification identifier from a received data packet, and parse out trusted service data from the data packet; and an execution unit configured to execute an instruction included in the trusted service data and return an execution result.

The present disclosure also provides a trusted service system, which includes: an apparatus for trusted service management; and an apparatus for requesting trusted service management, wherein:

the apparatus for trusted service management includes:

an identification identifier and address acquisition unit configured to obtain an identification identifier and address information of a computing unit;

a mapping unit configured to obtain a mapping table for the identification identifier and the address information of the computing unit;

a service-side request unit configured to initiate a trusted service request message to a server that provides trusted service management using the identification identifier of the computing unit; and a service-side response processing unit configured to receive a corresponding trusted service response message, and transmit the trusted service response message to the computing unit according to the mapping table;

the apparatus for requesting trusted service management includes:

an identification identifier and address reporting unit configured to report the address information and the identification identifier of the computing unit;

a data receiving unit configured to identify and obtain a matching data packet according to the identification identifier from a received data packet, and parse out trusted service data from the data packet; and an execution unit configured to execute an instruction included in the trusted service data and return an execution result.

Compared with existing technologies, the present disclosure has the following advantages:

The method, apparatus and electronic device for trusted service management provided by the present disclosure obtain an identification identifier and address information of a computing unit; obtain a mapping table for the identification identifier and the address information of the computing unit; initiate a trusted service request message to a server that provides trusted service management using identification identifier; and receive a corresponding trusted service response message, pass the trusted service response message to the computing unit according to the mapping table, and deploy a TSM Agent function in a gateway, such as a WiFi gateway, and perform a broadcast control of a group of smart devices on a same network segment based on the gateway, thus solving the problem of failures of some terminals in carrying all service logics of communications between a TSM Agent and a TSM Server caused by fragmented and low-end systems.

DETAILED DESCRIPTION

Figure 1:
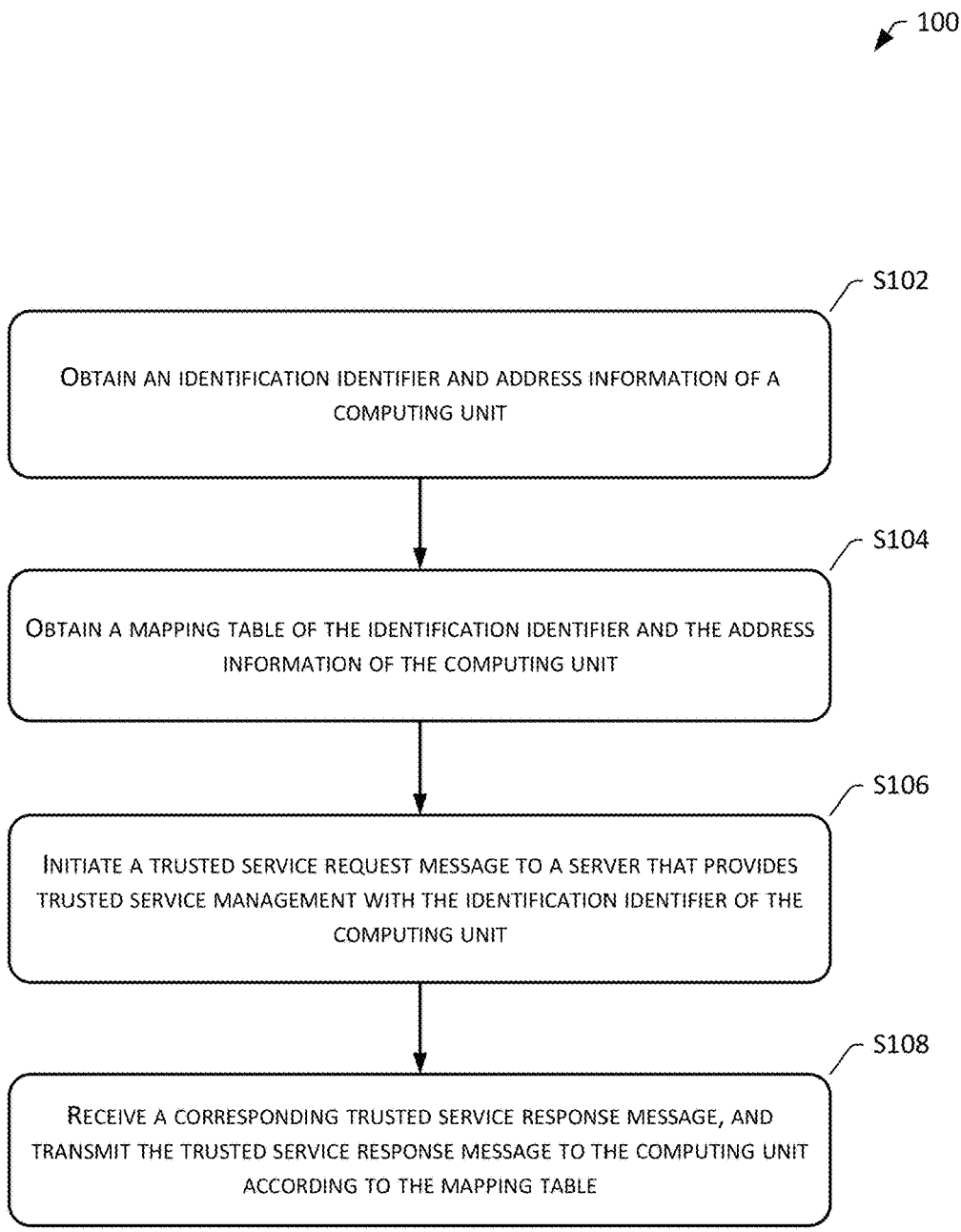
FIG. 1 is a schematic diagram of a processing flow of a method for trusted service management provided by the embodiments of the present disclosure.

A number of specific details are set forth in the following description to facilitate a full understanding of the present disclosure. However, the present disclosure can be implemented in a number of ways other than those described herein. One skilled in the art can make similar generalizations without violating the content of the present disclosure. Therefore, the present disclosure is not limited by details of implementations disclosed hereinafter.

The present disclosure provides a method for trusted service management. The present disclosure also relates to an apparatus for trusted service management. The application also relates to a method and an apparatus for requesting trusted service management. The present disclosure also relates to a trusted service management system. Details are sequentially described in the following embodiments.

The embodiments of the present disclosure provide a method for trusted service management.

Currently, banks, transportation operators, financial institutions, and other digital service providers are gradually deploying trusted service transactions to replace traditional counter service methods, providing users with trusted services through TSM platforms that comply with international GP specifications, and providing SE smart card chips on device ends to perform fast, efficient and safe air management, such as issuing cards in the air, remote control of secure applications based on SE chips, etc. In existing trusted service transactions, a TSM service end (TSM Server) is located in the cloud to provide trusted service management. A SE chip has an independent system on chip (Card OS), and is integrated or embedded in a mobile phone or other smart device, providing hardware level security for a device end. A TSM agent (TSM Agent) is deployed on a smart device that is embedded with a SE chip. A trusted transaction is completed through data communications between the TSM Agent and the TSM Server. Trusted service management is mostly used in mobile financial projects, but is not ruled out from being widely used in the field of Internet of Things in the future. Some sensitive data can be safely stored in complex and fragmented IoT terminal devices, such as keys, certificates, core data, and other information. There are many types of terminal devices in the field of Internet of Things. Due to the wide variety of terminals and different versions, a problem of low-end and fragmented systems of terminal devices exists. Given that existing trusted service management uses an end-to-end technical solution of a service end to a device end, some terminals cannot bear all service logics of a handshake communication between a TSM Agent and a TSM Server.

A method for trusted service management provided in the present disclosure deploys a TSM Agent on a gateway device and performs a broadcast TSM group device control on a gateway node, thereby replacing an existing end-to-end trusted service solution of deployment of a TSM Agent on a terminal device. This further expands TSM, and performs technological extensions for scenarios of the Internet of Things. A so-called TSM group devices refers to smart devices that are connected to a same gateway having TSM Agent functions and are integrated or embedded with SE chips. For example, a TSM Agent is deployed in a WiFi smart gateway, and a broadcast control of sub-devices in a group on a same network segment is performed based on a WiFi network. In this way, the TSM Agent extends an existing point-to-point control topology of TSM to a WiFi-based broadcast control based on a WiFi communication protocol.

Based on technical solutions of trusted service management that include a banking TSM platform, a WiFi gateway, and a mobile phone integrated with SE, and in conjunction with a process of card issuance in the air, the method for trusted service management provided in the present disclosure is described in detail using the following embodiments. It should be noted that the method for trusted service management provided by the present disclosure can also be applied to scenarios such as transportation operations, financial institutions, other digital services, and the Internet of Things.

Figure 2:
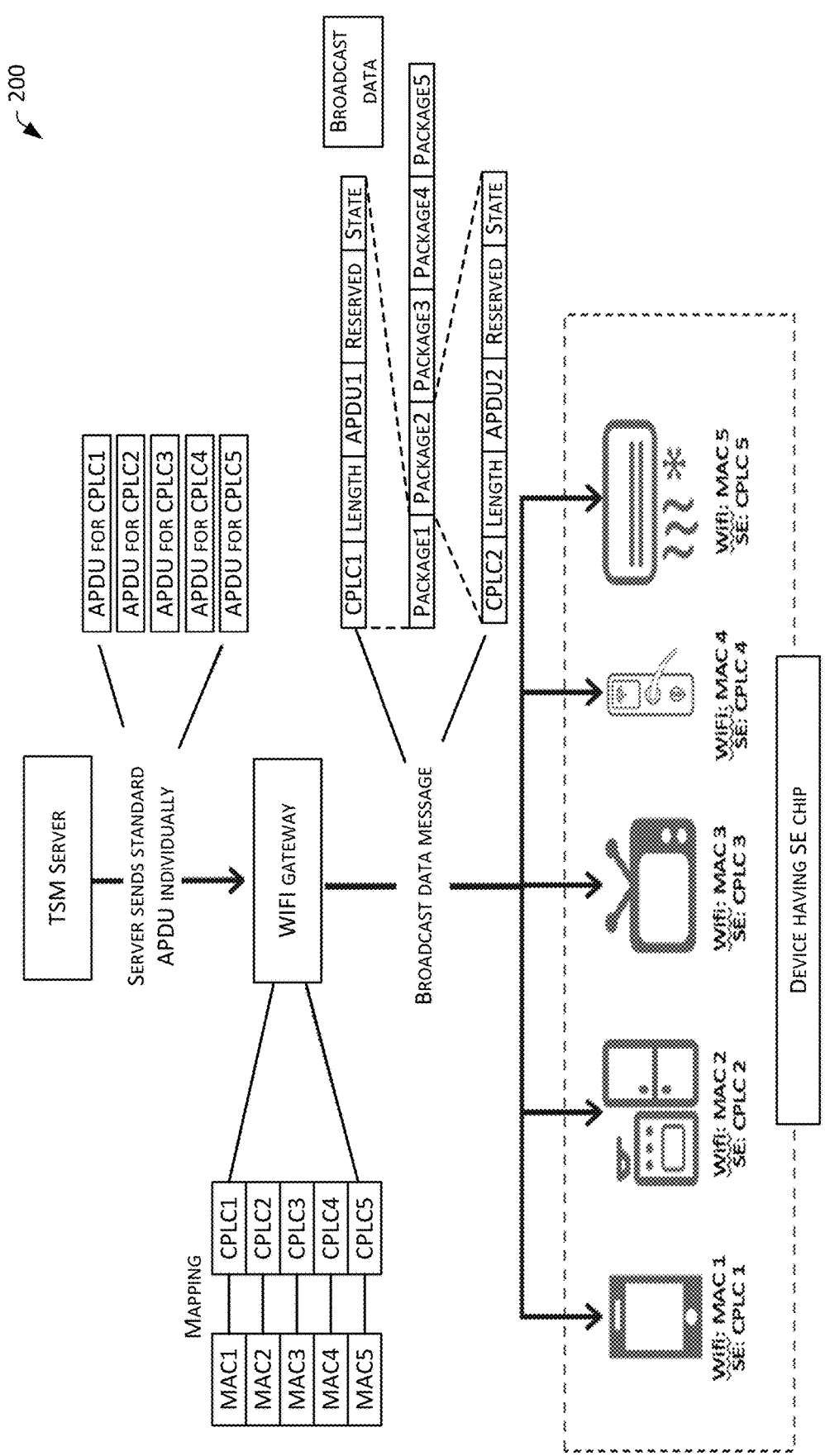
FIG. 2 is a schematic diagram of a principle framework of a method for trusted service management provided by the embodiments of the present disclosure.
Figure 3:
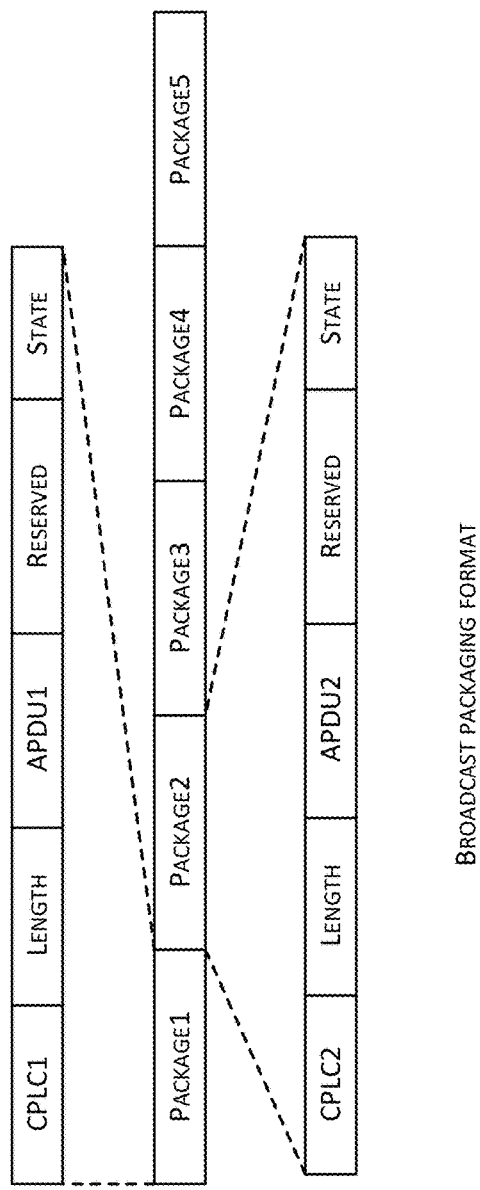
FIG. 3 is a schematic diagram of a packet format of broadcast data packet provided by the embodiments of the present disclosure.
Figure 4:
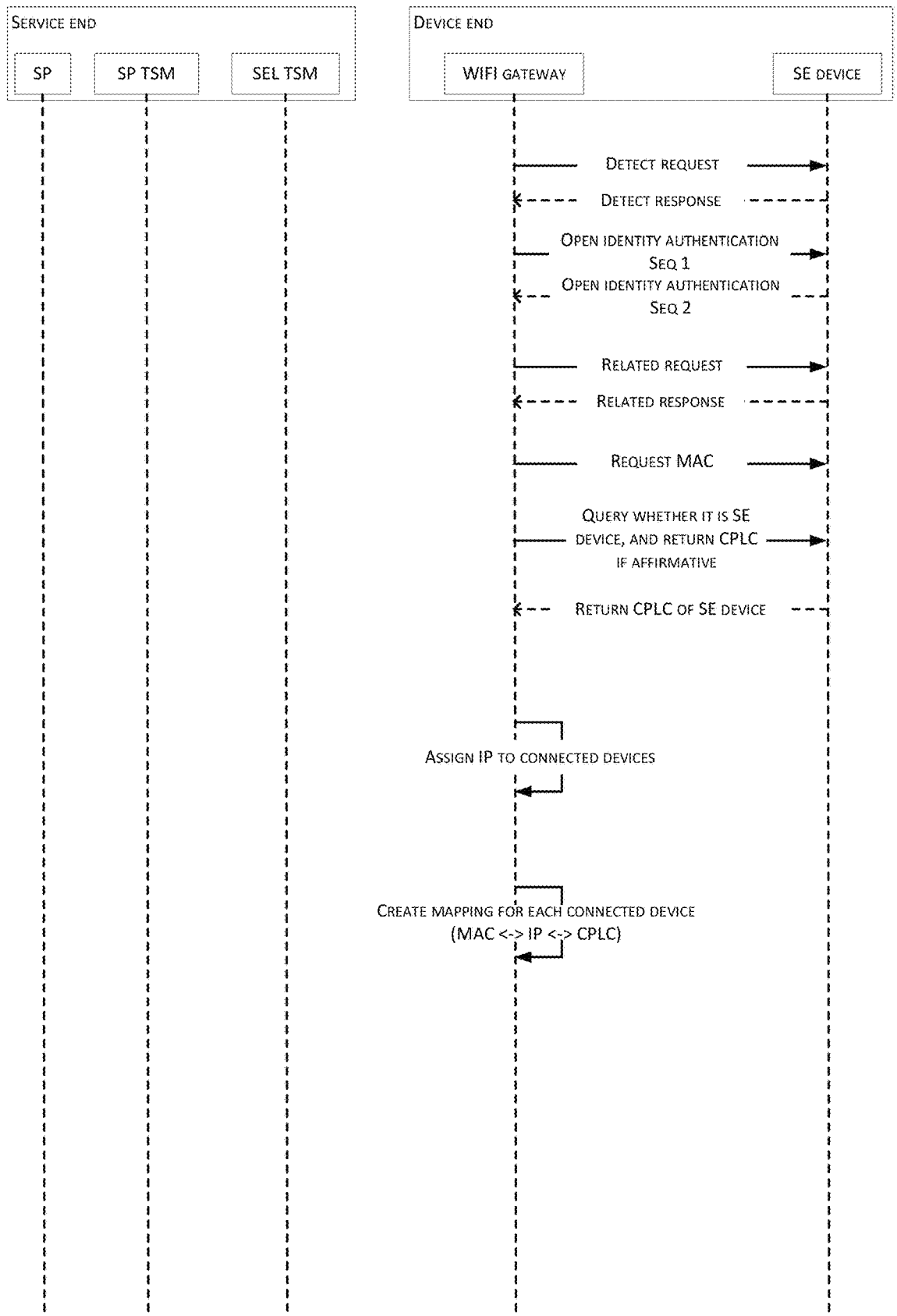
FIG. 4 is a sequence diagram of a process of creating a mapping table for an identification identifier and address information in a method for trusted service management provided by the embodiments of the present disclosure.
Figure 5:
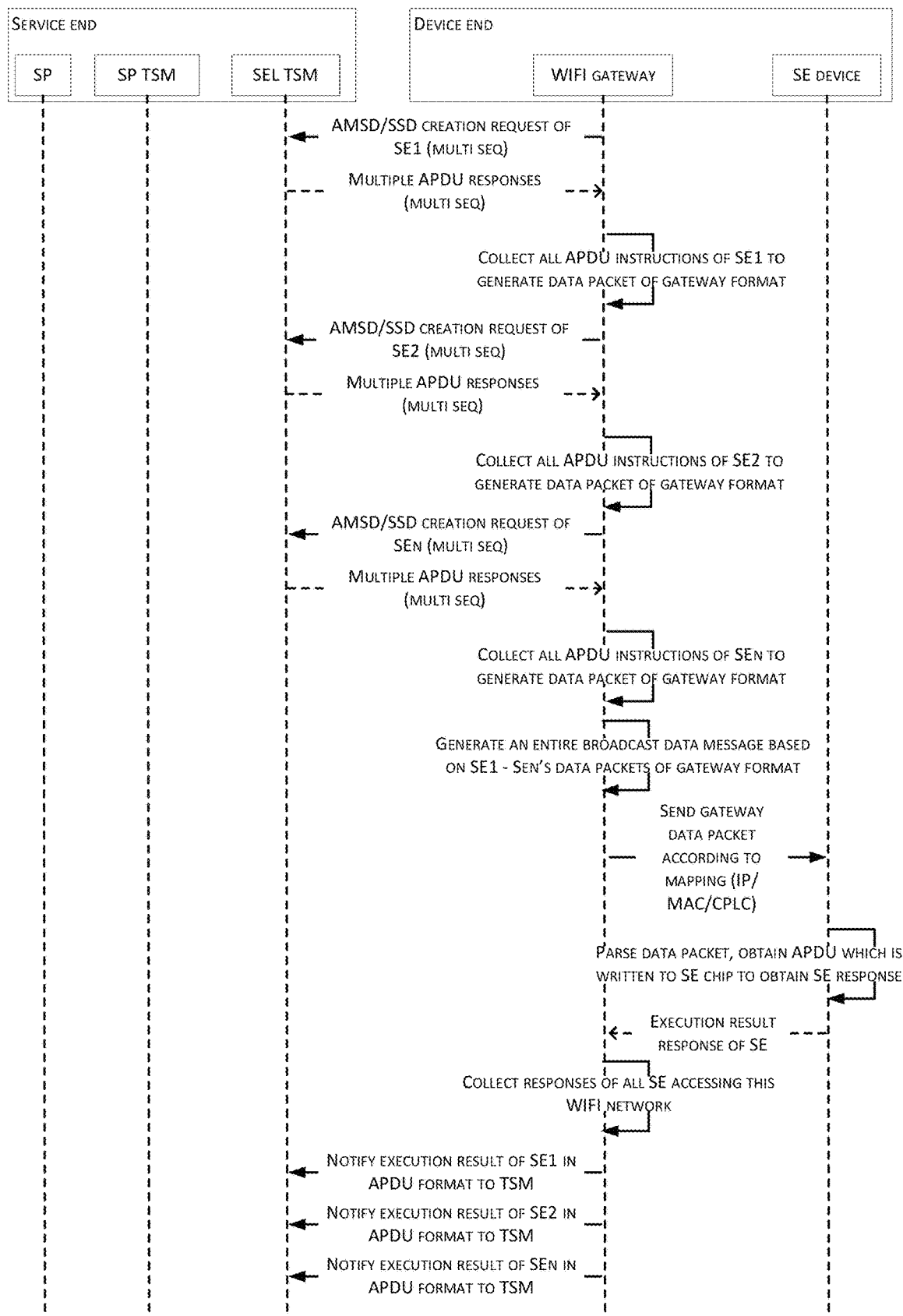
FIG. 5 is a sequence diagram of a process of creating a security domain in a method for trusted service management provided by the embodiments of the present disclosure.
Figure 6:
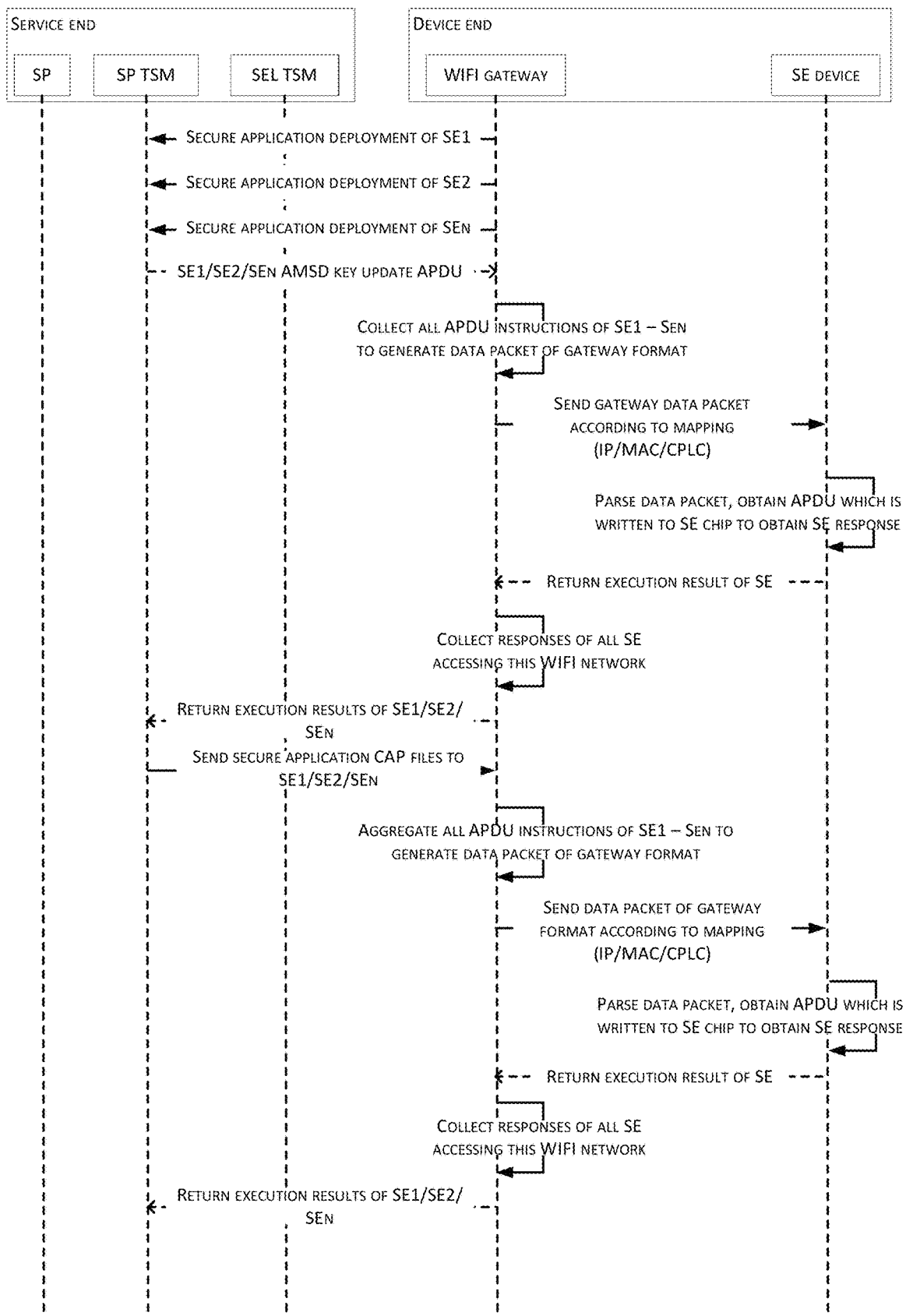
FIG. 6 is a sequence diagram of a process of downloading a secure application program in a method for trusted service management provided by the embodiments of the present disclosure.
Figure 7:
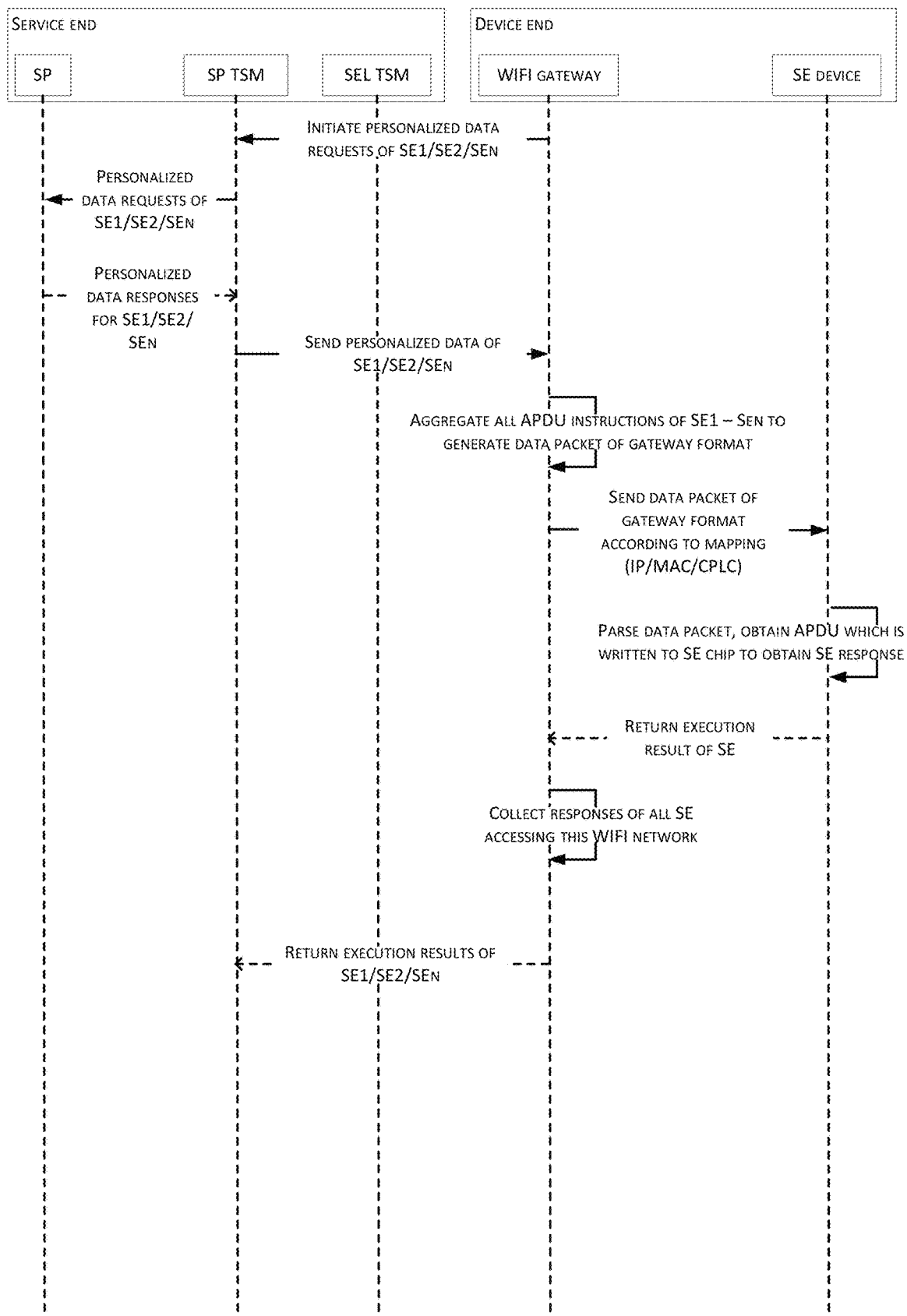
FIG. 7 is a sequence diagram of a personalized data flow in a method for trusted service management provided by the embodiments of the present disclosure.

An exemplary method for trusted service management provided by the embodiments of the present disclosure is described below with reference to FIGS. 1-7. FIG. 1 is a schematic diagram of a processing flow of a method 100 for trusted service management provided by the embodiments of the present disclosure. FIG. 2 is a schematic diagram of a principle framework 200 of a method for trusted service management provided by the embodiments of the present disclosure. FIG. 3 is a schematic diagram of a packet format 300 of a broadcast data packet provided by the embodiments of the present disclosure. FIG. 4 is a sequence diagram of a process 400 of creating a mapping table for an identification identifier and address information in a method for trusted service management provided by the embodiments of the present disclosure. FIG. 5 is a sequence diagram of a process 500 of creating a security domain in a method for trusted service management provided by the embodiments of the present disclosure. FIG. 6 is a sequence diagram of a process 600 of downloading a secure application program in a method for trusted service management provided by the embodiments of the present disclosure. FIG. 7 is a sequence diagram of a personalized data flow 700 in a method for trusted service management provided by the embodiments of the present disclosure. The method for trusted service management includes operations S102 to S108.

In implementations, the method for trusted service management is performed based on a gateway. In implementations, the gateway is a WIFI gateway. The gateway transfers communication data between a computing unit and a server that provides trusted service management. The computing unit is also called a secure carrier. For example, connection(s) is/are established with one or more secure carriers that access the gateway device, APDU data provided by the server that provides the trusted service management is broadcasted to secure carrier(s) in a same network segment within the gateway. State report APDUs of these secure carriers are received, and returned to the server that provides the trusted service management.

The so-called APDU, which is also called as an Application Protocol Data Unit, refers to an application protocol data unit between a secure device and a SE chip (or a smart card) specified in GP specifications in implementations, and is generally composed of a data packet header and a data body. The data packet header is an essential portion, and the data body is an optional portion. The SE chip provides a hardware-level security environment for a device end, such as a mobile phone, and a main program on the device end is exposed to a network environment, and is therefore generally considered to be an insecure environment. The APDU instruction is used for data communications between the two. In implementations, the APDU includes at least any of the following content or instruction information: life cycle management information, rights management information, key escrow information, authentication information, secure data transmission and processing information, sensitive personal data, and state report information.

Operation S102: Obtain an identification identifier and address information of a computing unit.

This operation is to obtain an identification identifier and address information of a computing unit where a trusted service is deployed.

The computing unit is a secure element or a secure device with embedded secure element(s). In addition, the secure element may also be integrated in the secure device. The so-called secure element is SE. SE chips are mostly used in the fields of banks and public transportation smart cards. In implementations, an air management of a SE chip is performed through a TSM platform and a WiFi gateway device.

In implementations, the computing unit is a secure element or a secure device that is able to recognize APDU data specified by a global platform and execute an APDU instruction. Specifically, the computing unit is a mobile phone integrated with an SE chip. A SE chip that is used is a Java card, which can recognize APDU data specified by a global platform and execute APDU instructions. An independent Security Domain (security domain) is set in the SE chip, and each security domain has an independent key for performing management. The TSM Server has a key that is the same as that of a security domain of a local SE, and encrypts data to be transmitted, which is then transmitted to the SE chip in a form of an APDU instruction. After performing decryption using the key of the security domain, the SE chip analyzes and uses data transmitted from the TSM.

In implementations, a Java smart card supports a Java virtual machine, and a secure application delivered to the SE by the TSM is stored in a form of a Java Applet and runs on the SE chip. A process of remotely delivering a secure application by a TSM platform and a SE is called a TSM air card issuing process. Three roles are involved in the TSM air card issuing process: a TSM Server which acts as a service end for remote control, a TSM Agent, and a secure element SE. The TSM Server specifically includes: a SEI-TSM and a SP-TSM. The SEI-TSM is configured to create and manage security domains, and the SP-TSM is configured to manage air issuing process and life cycle management of secure applications. The TSM Agent is software SDK placed in a WiFi gateway device, and is responsible for conducting handshake communications with the TSM Server and conducting communications with a SE chip. These communication processes include sending request data and receiving return data. A method of communication between a gateway and a SE chip is through performing an overall broadcast control by the WiFi gateway on access devices in the gateway. Specifically, after collecting all information sent by a service end, the gateway forms a packet according to certain rules and then performs broadcasting thereof. After the SE chip receives an APDU instruction sent by TSM from the TSM Agent, the SE chip performs relevant operations such as authentication, decryption actions, data calculation, storage, etc., in Card OS. These processes are securely isolated and performed in the SE chip. For example, a fund is deducted when a public transportation card is swiped, and a number of times or a monetary amount is deducted from a parking card, etc. In practical applications, a secure device accessing the gateway is embedded or integrated with a SE chip. After receiving a broadcast data packet from the gateway device accessed by the secure device, the secure device obtains data of the device, which is written into the SE chip. A system principle of a system actually deployed in implementations is shown in FIG. 2. The figure shows a framework of a system principle associated with a method for trusted service management provided by the embodiments of the present disclosure.

In implementations, the identification identifier is a production life cycle CPLC of a secure element of the computing unit. In addition, the identification identifier may also be a position identification identifier of the computing unit. The address information is a MAC and/or an IP of the secure element or the secure device (SE Device). In addition, for a scenario in which a SE chip directly communicates with a TSM Agent without going through a secure device where the SE chip is located, the address information may also be a MAC and/or an IP obtained that is by a secure element from a secure device in which the secure element is embedded.

Specifically, in implementations, obtaining the identification identifier and the address information of the computing unit includes the following processing:

receiving a request from a requesting party, and performing an operation of connection and gateway authentication on the requesting party;

recording address information of the requesting party and querying whether the requesting party is a secure element or a secure device if the authentication is passed;

sending a request for obtaining the identification identifier of the computing unit if affirmative; and receiving and obtaining the identification identifier of the computing unit.

For example, FIG. 4 shows a sequence diagram of a process 400 of creating a mapping table of an identification identifier and address information of a computing unit according to the embodiments of the present disclosure, and also shows a process of obtaining address information and an identification identifier. A secure device (SE Device) runs in a Station mode. A WiFi gateway initiates a probe request (Probe Request) message, and the SE Device makes a response (Probe Response). After the SE device enters a password, the WiFi gateway performs authentication thereon. After the authentication is successful, the gateway records a Mac address of the SE Device that acts as a Station device. The gateway queries whether it is an SE device. If it is found with SE, the gateway requests to obtain identification ID (CPLC) of the SE chip.

Operation S104: Obtain a mapping table of the identification identifier and the address information of the computing unit.

This operation is to establish a mapping table of the identification identifier and an address of the computing unit according to the address information and identification identifier obtained at operation S102.

In implementations, if the address information is a MAC and/or an IP of the secure element or the secure device, the mapping table includes any of the following correspondence relationships: a correspondence relationship between CPLC and MAC, a correspondence relationship between CPLC and IP, a correspondence relationship among CPLC, MAC and IP.

In implementations, based on the obtained identification identifier and address information of the computing unit, a mapping table of the identification identifier and the address information of the computing unit is established and stored on the gateway. A practical processing flow sequence of establishing a mapping table can be referenced to FIG. 4. After obtaining all CPLCs connected to SE devices, a WiFi gateway creates a mapping table (Mapping) for MACs, IPs, and CPLCs of secure devices, which is used for communicating with a TSM Server on the one hand, and communicating with SE devices on the other hand. In a subsequent TSM-controlled interaction process, data repackaging, broadcasting and receiving data are performed, with a reliance on a correspondence relationship of such mapping, thus orderly completing interactions between the SE device and a service end according to logics of the TSM Server.

Operation S106: Initiate a trusted service request message to a server that provides trusted service management with the identification identifier of the computing unit.

This operation is for the gateway to proxy the computing unit to request a server that provides trusted service management to issue an instruction using a SE chip identification ID of the computing unit.

In implementations, after the WiFi gateway establishes a mapping table of the MACs, IPs and CPLCs of the SE devices accessed thereby, the WiFi gateway initiates an air card issuing request. When the TSM Agent on the WiFi gateway communicates with the TSM Server, a CPLC of a SE is used as an ID for communication. In this way, the TSM Server still considers handling processes related to SE chips one by one in a communication process, and does not perceive an existence of the gateway.

Initiating the request message to the server that provides the trusted service management using the identification identifier of the computing unit includes initiating the request message in a real-time or in a batch mode. For example, after obtaining an identification identifier and address information of a secure device, the gateway initiates a request to TSM, or encapsulates data packets to initiate a request after collecting information of all secure devices that access thereto.

In a practical deployment of the embodiments of the present disclosure, after collecting information of all SE devices that access thereto, the gateway triggers an air card issuing process. The gateway separately sends a trusted service request to the TSM with information of each SE. For example, as shown in FIG. 5, a time sequence of a security domain creation process of the embodiments of the present disclosure includes an AMSD/SSD creation request of SE1, an AMSD/SSD creation request of SE2, an AMSD/SSD creation request of SEn, etc. As shown in FIG. 6, a secure application download process of the embodiments of the present disclosure includes a deployment secure application request of SE1, a deployment secure application request of SE2, and a deployment secure application request of SEn. As shown in FIG. 7, a personalized data flow of the embodiments of the present disclosure includes a personalized data request of SE1, a personalized data request of SE2, and a personalized data request of SEn. SE1, SE2, and SEn are different SE devices connected to the same WiFi gateway with the TSM Agent function. A so-called AMSD refers to an authorized mode secure domain (Authorized Mode Secure Domain), or an SSD refers to a simple mode security domain (or Simple Mode Secure Domain).

In addition, for initiating a trusted service request message to a server that provides trusted service management, other than triggering the trusted service request by a gateway with a TSM Agent function, a computing unit may also trigger the trusted service request. Under a condition that the computing unit triggers the trusted service request, the gateway transparently transmits the trusted service request message that is received from and initiated by the computing unit.

Operation S108: Receive a corresponding trusted service response message, and transmit the trusted service response message to the computing unit according to the mapping table.

This operation is to transmit a corresponding trusted service response message sent by the server that provides the trusted service management for the trusted service request at operation S106 to a group of SE devices that access the gateway.

In implementations, transmitting the trusted service response message to the computing unit in a broadcast mode specifically includes the following processing:

assembling the response message into a broadcast data message according to a packaging protocol; and broadcasting the broadcast data message according to the mapping table, wherein the packaging protocol includes at least relevant information of the following fields: header information and APDU data; the header information includes at least the following fields: an identification identifier and a length, for example, CPLC and Length fields in a broadcast packet format as shown in FIG. 3. In addition, the packaging protocol includes any one of the following fields: reserved bits and state(s), such as Reserved and State fields in the broadcast packet format as shown in FIG. 3. One or more reserved bits and states may exist respectively.

In implementations, a data packet of a gateway format used in implementations is assembled according to a packaging method as shown in FIG. 3, and is a broadcast data packet. The trusted service response message delivered by the TSM Server is transmitted to the computing unit in a broadcasting mode according to correspondence relationships among MACs, IPs, and CPLDs. The broadcast data message includes one or more data packets assembled according to the packaging protocol.

In implementations, the WiFi gateway receives corresponding data returned by the TSM according to an ID (CPLC) of each SE chip (where CPLC is used as an identification ID for distinction), collects all APDU instructions of each SE to construct data packets of a gateway format, and aggregates thereof into an entire broadcast data message. For example, the time sequence of the security domain creation process as shown in FIG. 5 includes multiple APDU responses corresponding to the AMSD/SSD creation request of SE1, multiple APDU responses corresponding to the AMSD/SSD creation request of SE2, and multiple APDU responses corresponding to the AMSD/SSD creation request of SEn. The gateway collects all APDU instructions of SE1 to form a data packet of the gateway format, and also form respective data packets of the gateway format for all APDU instructions for SE2 and SEn. The gateway encapsulates these data packets as an entire broadcast data message, and broadcasts the broadcast data message in the WiFi network according to the mapping table (including the correspondence relationships among MACs, IPs, and CPLDs).

In implementations, the TSM Agent function is deployed on the WiFi gateway. The Wifi gateway directly communicates with the TSM, and then uses the WiFi network to distribute APDU instructions by means of broadcasting in a local area network. Device ends in the WiFi gateway conduct communications with the WiFi gateway according to a protocol described and specified in the present disclosure. The TSM server does not perceive a communication structure of the device ends and the gateway end, thereby ensuring an expansion of functions while being compatible with existing TSM systems. In this way, when a future deployment employs the method for trusted service management provided in implementations as a basis for solutions, an existing TSM Server does not need to be modified, and the deployment only needs to be made on a WiFi gateway and devices accessing this type of gateway that support this solution in order to achieve effects of a TSM broadcasting style of multi-point control.

In implementations, the embodiments of the present disclosure further include receiving an execution result returned by the computing unit, and sending the execution result to the server that provides the trusted service management. Specifically, the computing unit executes an APDU instruction included in the trusted service response message, generates a state report APDU response message, and returns the state report APDU response message to the WiFi gateway. The WiFi gateway collects all SE responses under the WiFi network, and returns execution results of each SE to the TSM server. For example, in implementations as shown in FIG. 5, corresponding to the AMSD/SSD creation request of SE1, the AMSD/SSD creation request of SE2, and the AMSD/SSD creation request of SEn included in the time sequence of the security domain creation process, the gateway encapsulates respective responses as an entire broadcast data message and performs broadcasting thereof. Each SE device in the WiFi network parses the broadcast message, extracts the APDU, writes the APDU to a SE chip thereof. The SE chip executes the corresponding APDU instruction, and returns an execution result. The WiFi gateway collects all SE responses in the network, and notifies a corresponding service end of the TSM according to a CPLC of each SE in an APDU format. Specifically, the gateway transparently transmits the execution result included in the response message returned by the computing unit to the server that provides the trusted service management. In other words, the execution result included in the response message returned by the computing unit is APDU data. In addition, sending the execution result to the server that provides the trusted service management may also be that the gateway repackaging the execution result returned by the computing unit through its TSM Agent function and sending thereof to the corresponding service end.

In implementations, a practical solution of deploying trusted service includes: a server SEI-TSM (or Secure Element Issuer-Trusted System Manager) that provides trusted service management, and a TSM server SP-TSM (Service Provider Trusted Service Management) of a service provider, and a service end SP (Service Provider) of the service provider, a WiFi gateway, and SE device(s). Therefore, performing an air card issuance includes the following processes: (1) creating a security domain, (2) downloading a secure application, (3) and writing personalized data. The SEI-TSM is a trusted management server for issuing secure components, mainly for performing SE life cycle and security domain management services. The SP-TSM is a TSM server of a service provider of trusted service management, which mainly provides application life cycle services, and acts as an aggregator for multiple SP accesses, such as a TSM of UnionPay. The SP is a server of the service provider, such as a server of each bank. The SP generally completes a deployment of trusted service services and a management of application life cycles through a SP-TSM accessed thereby, or may also submit a secure application directly through a SEI-TSM to allow the SEI-TSM to complete card content management.

(1) Creating a security domain (Security Domain), with a time sequence diagram of a process thereof being shown in FIG. 5, and including the following processing:

The gateway uniformly initiates a request to the SEI-TSM. The trusted service request message is to a security domain creation request APDU, i.e., a data format of the request sent by the gateway to the SEI-TSM is an APDU specified by GP, and separately make requests to the SEI-TSM according to respective CPLC information of each device, for example, a SSD creation request of SE1, and a SSD creation request of SE2.

After the SEI-TSM receives the request, a trusted service response message that is returned is a secure domain creation instruction APDU. Specifically, the SEI-TSM separately returns an APDU that is formed by encrypting the secure domain creation instruction to the WiFi gateway. The trusted service response includes one or more responses APDU.

WiFi collects all APDU instructions of each SE under the WiFi network, encapsulates a data packet of a gateway format, encapsulates data packets of all SEs into an entire broadcast data message using a packaging method as shown in FIG. 3, and sends the broadcast data message by means of broadcasting according to correspondence relationships among MACs, IPs and CPLCs.

After receiving the broadcast data packet, a SE device selects and unpacks a data packet corresponding to its own CPLC, extracts the security domain creation instruction APDU, and communicates with a local SE chip for writing thereof into the SE chip. The SE chip decrypts the APDU, executes a corresponding instruction, create a security domain in a secure element, and return an execution result to the WiFi gateway.

The WiFi gateway collects execution results of all the SEs under the WiFi network, and notifies the SEI-TSM of the execution results of the SEs for state reporting. The notification is data in an APDU format. At this point, the secure domain creation process of TSM through broadcasting is completed.

(2) Downloading a secure application Applet, with a time sequence diagram of a process thereof being shown in FIG. 6, and including the following processing:

In implementations, when a received execution result returned by the computing unit corresponds to a successful creation of a security domain, the gateway device records a state of each SE device as a successful creation of the security domain. Upon receiving the successful creation of the security domain returned by the computing unit the following processing is performed: initiating an application download request to the SP-TSM with the identification identifier of the computing unit. For example, the WiFi gateway initiates a secure application deployment of SE1 using CPLC1 of the SE1, and initiates a secure application deployment of SE2 using CPLC2 of the SE2. The secure applications are small application programs (Applets).

In this scenario, the trusted service request message received by the SP-TSM is an application download request. A corresponding trusted service response message includes: an APDU formed by the SP-TSM assembling and encrypting an application program requested to be downloaded. The APDU is packaged into a broadcast data packet by the gateway according to the packaging protocol according to the packaging method as shown in FIG. 3, and sent out by means of broadcasting. For example, after receiving the deployment secure application request of the SE1, the SP-TSM first returns a key update APDU, and then returns a secure application CAP file (i.e., an execution file of the application program) after the key update is successful.

The WiFi gateway aggregates APDU instructions corresponding to secure application CAP files of all the SEs under the WiFi network, generates an entire broadcast data message in the packaging method as shown in FIG. 3, and broadcasts the broadcast data message to each secure device under the WiFi based on the mapping table (which includes the correspondence relationships among MACs, IPs, and CPLCs).

A SE device receives the broadcast data message, identifies and obtains a data packet matching a CPLC thereof, parses APDU data information, communicates with a SE chip, and writes to the SE chip.

The SE chip decrypts and executes an APDU instruction, installs an Applet issued by the SP-TSM, forms a state report APDU by constructing and encrypting according to an execution result, and returns the state report APDU to the WiFi gateway.

The WiFi gateway receives an execution result returned by the computing unit. This scenario includes receiving an application program installation state report APDU. After the gateway collects execution result responses of all the SEs connected to its network, the gateway returns the state report APDU to the SP-TSM.

(3) Writing personalized data, with a time sequence of a process thereof being shown in FIG. 7, and including the following processing:

When the execution result returned by the computing unit is an application installation state report APDU, after the gateway returns the state report APDU to the SP-TSM, the following processing is also performed:

the gateway sending a personalized request to the SP-TSM with the identification identifier of the computing unit; the SP-TSM obtaining personalized data according to the personalized request and sending the personalized data to the gateway in an APDU data format; and the gateway collecting and packaging the data as a broadcast data packet, and broadcasting the broadcast data packet to the computing unit based on the mapping table.

In implementations, the gateway device initiates a download or update operation of personalized data, i.e., the gateway sends a personalized request to the SP-TSM, and the SP-TSM obtains personalized data from the SP according to the personalized request, for example, obtaining the personalized data from a specific SP Server according to information such as CPLC. The SP-TSM sends the personalized data to the gateway in a form of APDU instructions. The gateway collects APDU instructions of personalized data for all the SEs in the WiFi network, packages the APDU as a broadcast data packet using a packaging method as shown in FIG. 3 according to the packaging protocol, and broadcasts the broadcast data packet according to the mapping table.

A SE device receives the broadcast data packet, extracts the data packet that matches its own CPLC, parses the APDU instruction and communicates with the SE. The SE decrypts and executes the APDU instruction, encrypts an execution result to form state report data of the APDU format, and returns the state report data to the gateway, which forwards the state report data to the SP-TSM.

The above process completes air card issuing process based on the WiFi gateway in a broadcasting manner. All the SE devices in the gateway can be controlled by the gateway, and perform actions cooperatively. The gateway is a core central console of this solution to request the TSM and conduct communications with the SE devices.

The above is a description of an exemplary method for trusted service management provided by the present disclosure.

Figure 8:
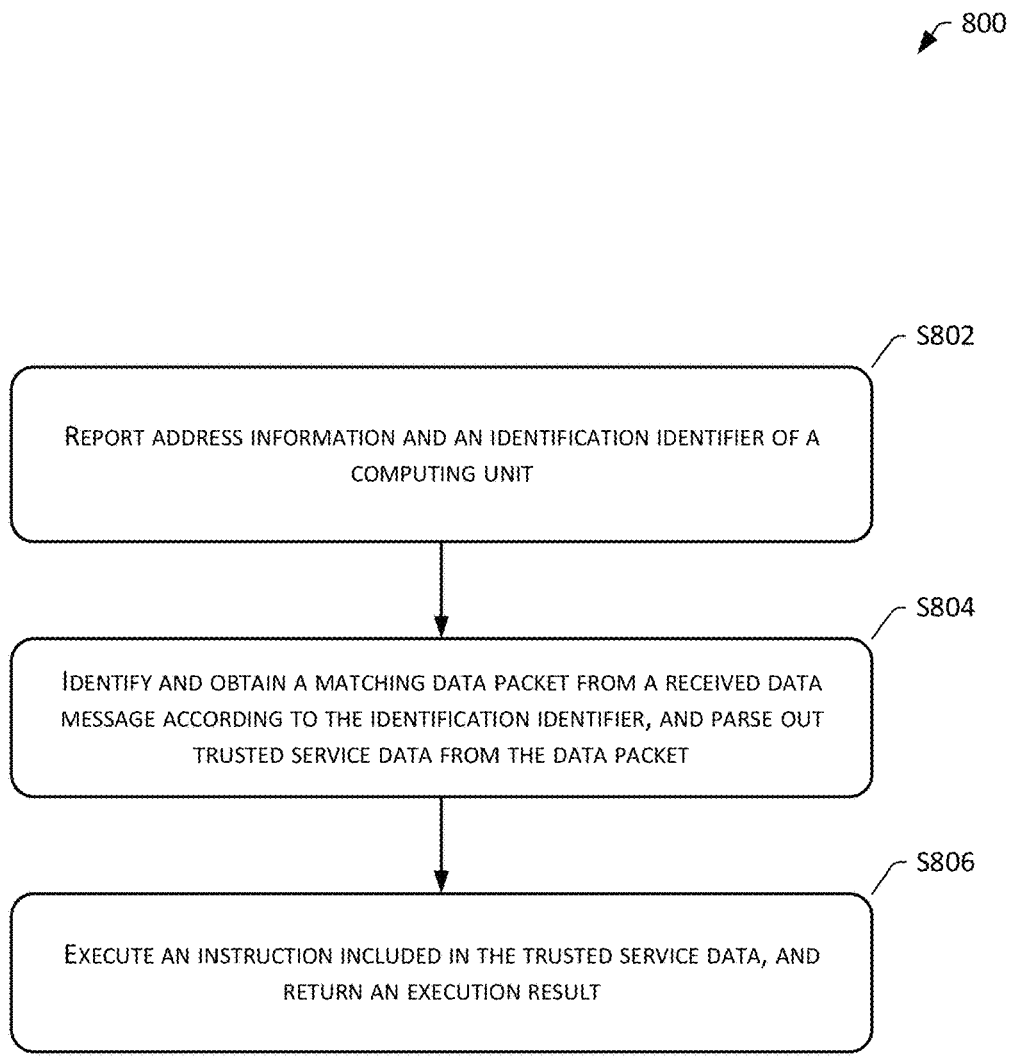
FIG. 8 is a flowchart of a process of a method for requesting trusted service management provided by the embodiments of the present disclosure.

Based on the above embodiments, the present disclosure also provides an exemplary method for requesting trusted service management, which will be described below with reference to FIGS. 8 and 3. Since this embodiment is based on the foregoing embodiments, this embodiment is briefly described only, and relevant parts can be referenced to the above embodiments. FIG. 8 is a processing flowchart of a method 800 for requesting trusted service management provided by the embodiments of the present disclosure. FIG. 3 is a schematic diagram of a packaging format 300 of a broadcast data packet provided by the embodiments of the present disclosure.

In implementations, the method for requesting trusted service management is performed based on a computing unit, i.e., reporting address information and an identification identifier of the computing unit; identifying and obtaining a matching data packet from a received data message, according to the identification identifier, and parsing out trusted business data from the data packet; executing an instruction included in the trusted business data, and returning an execution result, which are performed based on the computing unit. The trusted service data is APDU data specified by a global platform.

As shown in FIG. 8, the method for requesting trusted service management includes:

Operation S802: Report address information and an identification identifier of a computing unit.

This operation is to report an address and an identification ID of a computing unit to a gateway device to which the computing unit is connected.

In implementations, the identification identifier is CPLC information of a secure element, and the address information is a MAC and/or an IP of the secure element or a secure device.

In implementations, the method for requesting trusted service management is implemented in a computing unit. In practical applications, the entire trusted service solution is generally deployed in combination with a WiFi gateway having a TSM Agent function. Before reporting the identification identifier, the method includes: receiving a message querying whether it is a computing unit; and reporting the identification identifier of the computing unit if affirmative. Specifically, the computing unit is a secure device (or SE device) that is integrated or embedded with a SE chip and operates in a Station mode, and is connected to the WiFi gateway. After the secure device completes a communication security authentication and reports a MAC address, the WiFi gateway queries if the secure device is a device having a SE. If having a SE, the SE device is invited to upload an identification ID (such as CPLC) of the SE to the gateway. In general, the WiFi gateway will assign an IP to a SE device connected to the WiFi network. In addition, the IP of the SE device may also be fixed and has been set up already. In this scenario, the WiFi gateway also needs to record the IP of the SE device.

Operation S804: Identify and obtain a matching data packet from a received data message according to the identification identifier, and parse out trusted service data from the data packet.

This operation is that the computing unit parses out trusted service data from a received data packet.

In implementations, identifying and obtaining the matching data packet according to the identification identifier in the received data packet includes the following processing: the secure device identifying and obtaining, according to the identification identifier thereof, the matching data packet from the received broadcast data message; i.e., the received data message is the broadcast data message. Specifically, the broadcast data message is a data packet broadcasted by the WiFi gateway to which the computing unit connects and the trusted service data included therein is an APDU that complies with GP specifications. In practical implementations, the gateway internally stores MAC, IP, CPLC information and a mapping table containing correspondence relationships among these three types. The gateway uses a respective CPLC of each SE as an ID to conduct communications with a TSM server. As such, the TSM server returns corresponding data according to an ID (CPLC) of each SE chip (CPLC is used as an identification ID for distinction), without perceiving the presence of the gateway. After collecting APDUs delivered to each SE device by the TSM server, the gateway device assembles an entire broadcast data message according to a packaging format as shown in FIG. 3, and broadcasts the assembled broadcast data message on the WiFi network based on the mapping table.

Operation S806: Execute an instruction included in the trusted service data, and return an execution result.

The computing unit is a secure element or a secure device embedded with a secure element.

This operation is that after the secure device executes a corresponding APDU instruction after parsing out APDU data sent by the TSM server from the received data packet.

In implementations, a SE device picks out a data packet consistent with its own CPLC from a received broadcast data message, parses out a corresponding APDU instruction therefrom, and writes the APDU instruction to a SE chip (a communication data instruction that the SE chip can recognize and execute). In implementations, the SE chip executes the instruction included in the trusted service data and returns an execution result, which specifically includes the following processing:

communicating between the secure device and the secure element embedded in the secure device according to APDU data;

decrypting the APDU data through the secure element, executing the APDU instruction obtained after the decryption, and encrypt an execution result to form a state report APDU data; and reporting the state report APDU data to the gateway through the secure device, and further returning the state report APDU data to a server that provides trusted services through the gateway.

In addition, the following method of execution may be used for executing the corresponding APDU instruction included in the APDU data, and returning the execution result, which specifically includes the following processing:

decrypting the APDU format data by the computing unit, executing the APDU instruction obtained after the decryption, and encrypting the execution result to form a state report APDU data;

returning the state report APDU data to the gateway, and then returning the state report APDU data to the server that provides the trusted services through the gateway.

By returning the state report APDU data to the server that provides the trusted services through the gateway, the gateway transparently transmits the state report APDU data returned by the SE device to the server that provides the trusted service management. Alternatively, the execution result returned by the SE device is re-encapsulated by the gateway and sent to the TSM server. The WiFi gateway separately performs posting back to the TSM server according to a CPLC corresponding to each SE device, so as to realize air management control by the TSM in a broadcasting manner.

It should be noted that in the present embodiment, a WiFi gateway assembles APDU data returned by a TSM server for each request, and broadcasts thereof in the WiFi network. The corresponding APDU instruction included in the APDU data includes any of the following:

a security domain creation APDU instruction provided by the SEI-TSM server;

secure application deployment APDU issued by the SP-TSM; or personalized data APDU provided by the SP-TSM.

For example, a process of creating a security domain is used as an example. A process of creating an AMSD (authentication mode security domain) on a SE device in implementations will be described in conjunction with a gateway that has a TSM Agent (or TSM agent) function. Secure devices, SE1 and SE2, report respective addresses to the WiFi gateway, which are MAC1 and MAC2 respectively. After that, the WiFi gateway queries whether they are SE devices. Since SE1 and SE2 both are SE devices, SE1 and SE2 report respective identification identifiers to the gateway, which are CPLC1 and CPLC2 respectively. The WiFi gateway assigns IPs to SE1 and SE2, which are IP1 and IP2 respectively, establishes a mapping table in the WiFi gateway to store correspondence relationships among MACs, IPs, and CPLCs. The WiFi gateway uses CPLC1 as an identity identifier to initiate an AMSD creation request of SE1 to SEI-TSM. The SEI-TSM returns multiple APDU responses corresponding to SE1. The WiFi gateway uses CPLC2 as an identity identifier to initiate an AMSD creation request of SE2 to SEI-TSM. SEI-TSM returns multiple APDU responses corresponding to SE2. The WiFi gateway collects APDUs of all SEs, assembles thereof into an entire broadcast data message according to a packaging format as shown FIG. 3, and broadcasts the broadcast data message according to the mapping table. SE1 and SE2 extract their own data packets from the received broadcast data packet according to their CPLCs, parse out respective APDU instructions, and write the respective APDU instructions into their SE chips. The SE chips execute the respective instructions, and return respective execution results. After collecting respective responses of execution of SE1 and SE2, the gateway returns the respective responses to SEI-TSM according to their CPLCs.

Corresponding to the exemplary method for trusted service management provided by the present disclosure, the present disclosure also provides an apparatus for trusted service management.

Figure 9:
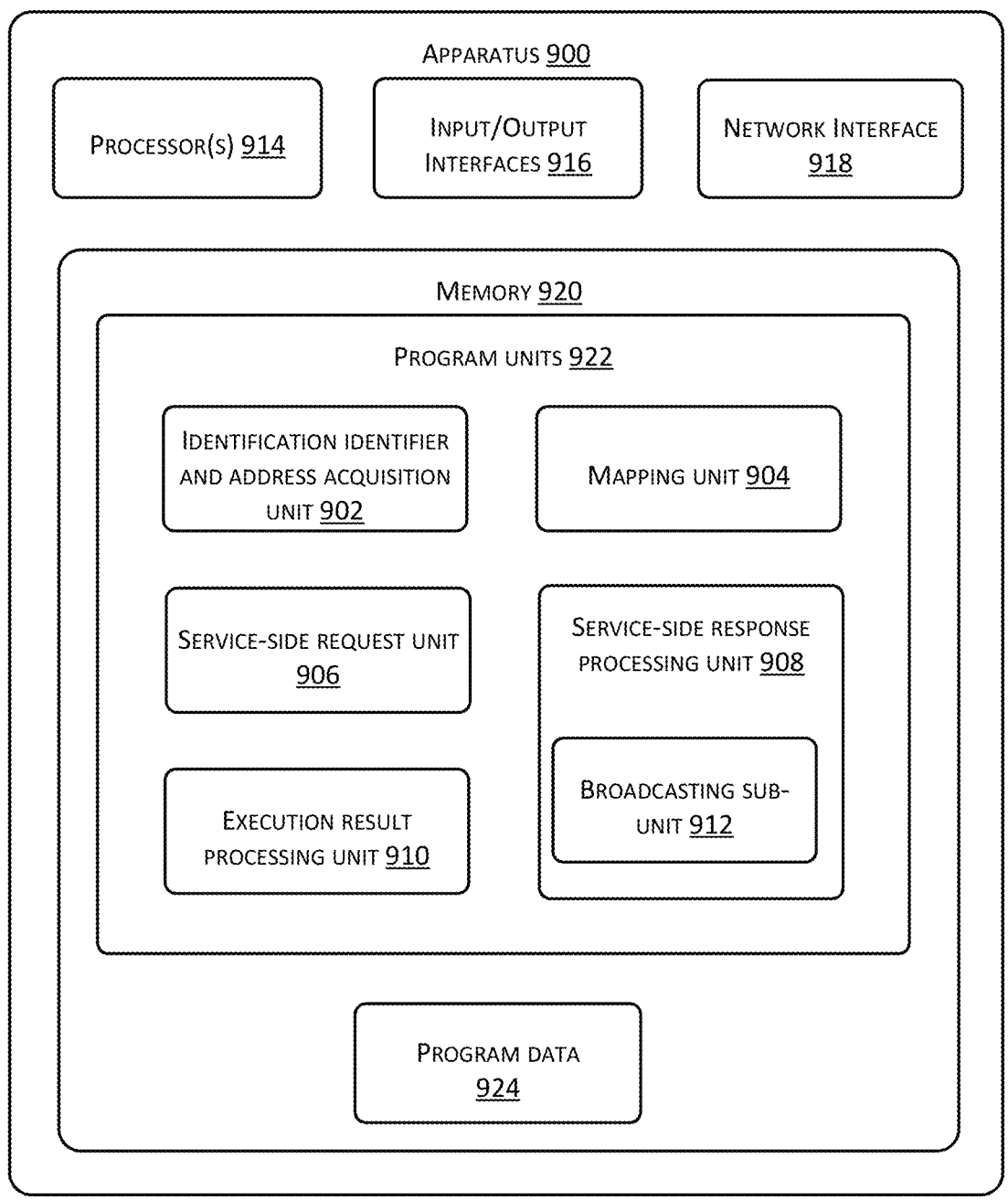
FIG. 9 is a schematic diagram of an apparatus for trusted service management provided by the embodiments of the present disclosure.

FIG. 9 shows a schematic diagram of an apparatus 900 for trusted service management provided by the present disclosure. Since apparatus embodiments are basically similar to the method embodiments, a description thereof is relatively simple. Relevant parts can be referenced to corresponding descriptions of the method embodiments. The apparatus embodiments described below are only schematic.

The present disclosure provides an apparatus 900 for trusted service management, which includes:

an identification identifier and address acquisition unit 902 configured to obtain an identification identifier and address information of a computing unit;

a mapping unit 904 configured to obtain a mapping table for the identification identifier and the address information of the computing unit;

a service-side request unit 906 configured to initiate a trusted service request message to a server that provides trusted service management using the identification identifier of the computing unit; and a service-side response processing unit 908 configured to receive a corresponding trusted service response message, and transmit the trusted service response message to the computing unit according to the mapping table.

In implementations, the method for trusted service management is performed based on a gateway.

In implementations, the gateway is a WIFI gateway.

In implementations, the computing unit is a secure element or a secure device embedded with a secure element.

In implementations, the apparatus for trusted service management further includes an execution result processing unit 910 configured to receive an execution result returned by the computing unit, and send the execution result to the server that provides the trusted service management.

In implementations, the service-side response processing unit 908 further includes a broadcasting sub-unit 912 configured to transmit the trusted service response message to the computing unit in a broadcasting mode.

In implementations, the identification identifier is a production life cycle CPLC of a secure element of the computing unit.

In implementations, the address information is a MAC and/or an IP of the secure element or the secure device.

In implementations, the identification identifier and address acquisition unit 902 is further configured to perform the following processing:

receiving a request from a requesting party, and performing an operation of connection and gateway authentication on the requesting party;

recording address information of the requesting party is and querying whether the requesting party is a secure element or a secure device if the authentication is passed;

sending a request for obtaining the identification identifier of the computing unit if affirmative; and receiving and obtaining the identification identifier of the computing unit.

In implementations, if the address information is a MAC and/or an IP of the secure element or the secure device, the mapping table includes any one of the following correspondence relationships: a correspondence relationship between CPLC and MAC, a correspondence relationship between CPLC and IP, a correspondence relationship among CPLC, MAC and IP.

In implementations, the computing unit is a secure element or a secure device that is able to recognize APDU data specified by a global platform and execute APDU instructions.

In implementations, the broadcasting sub-unit 912 may also be configured to:

assemble the response message into a broadcast data message according to a packaging protocol; and broadcast the broadcast data message according to the mapping table, wherein the packaging protocol includes at least relevant information of the following fields: packet header information and APDU data.

In implementations, the packet header information includes at least the following fields: the identification identifier and a length.

In implementations, the packaging protocol includes any of the following fields: reserved bits and a state.

In implementations, the broadcast data message includes one or more data packets assembled according to the packaging protocol.

In implementations, the APDU data includes at least any of the following content information:

life cycle management information, rights management information, key escrow information, authentication information, secure data transmission and processing information, sensitive personal data, and state report information.

In implementations, the server that provides the trusted service management is a SEI-TSM server, wherein the SEI-TSM is a trusted management end that issues secure elements.

In implementations, when the trusted service request message is a security domain creating request APDU, the trusted service response message is a security domain creating instruction APDU.

In implementations, the service-side request unit 906 is further configured to perform the following processing after the execution result returned by the computing unit is a successful creation of a security domain:

Initiate an application download request to a SP-TSM using the identification identifier of the computing unit, wherein the SP-TSM is a server of a service provider of the trusted service management.

In implementations, when the trusted service request message is an application download request, the corresponding trusted service response message includes: an APDU formed by assembling and encrypting an application program requested to be downloaded by the SP-TSM, wherein, the APDU is packaged into a broadcast data packet by a gateway according to the packaging protocol, and is sent out in a broadcast form.

In implementations, the execution result processing unit 910 is further configured to perform the following processing after the gateway receives the execution result returned by the computing unit: returning the state report APDU to the SP-TSM.

In implementations, the service-side request unit 906 is further configured to perform the following processing after the gateway returns the state report APDU to the SP-TSM:

sending a personalized request by the gateway to the SP-TSM using the identification identifier of the computing unit, wherein the SP-TSM obtains personalized data according to the personalized request and sends the personalized data to the gateway in an APDU data format, and the gateway collects data and assembles into a broadcast packet, which is broadcasted to the computing unit according to the mapping table.

In implementations, the service-side request unit 906 is further configured to transparently transmit the received trusted service request message initiated by the computing unit.

In implementations, the service-side request unit 906 is further configured to initiate a trusted service request message in a real-time or in a batch manner.

Corresponding to the exemplary method for requesting trusted service management provided by the present disclosure, the present disclosure also provides an apparatus for requesting trusted service management.

In implementations, the apparatus 900 may further include one or more processors 914, an input/output (I/O) interface 916, a network interface 918, and a memory 920. In implementations, the memory 920 may include program units 922 and program data 924. The program units 922 may include one or more of the foregoing units and/or sub-units as described in FIG. 9.

In implementations, the memory 920 may include a form of computer readable media such as a volatile memory, a random access memory (RAM) and/or a non-volatile memory, for example, a read-only memory (ROM) or a flash RAM. The memory 920 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Figure 10:
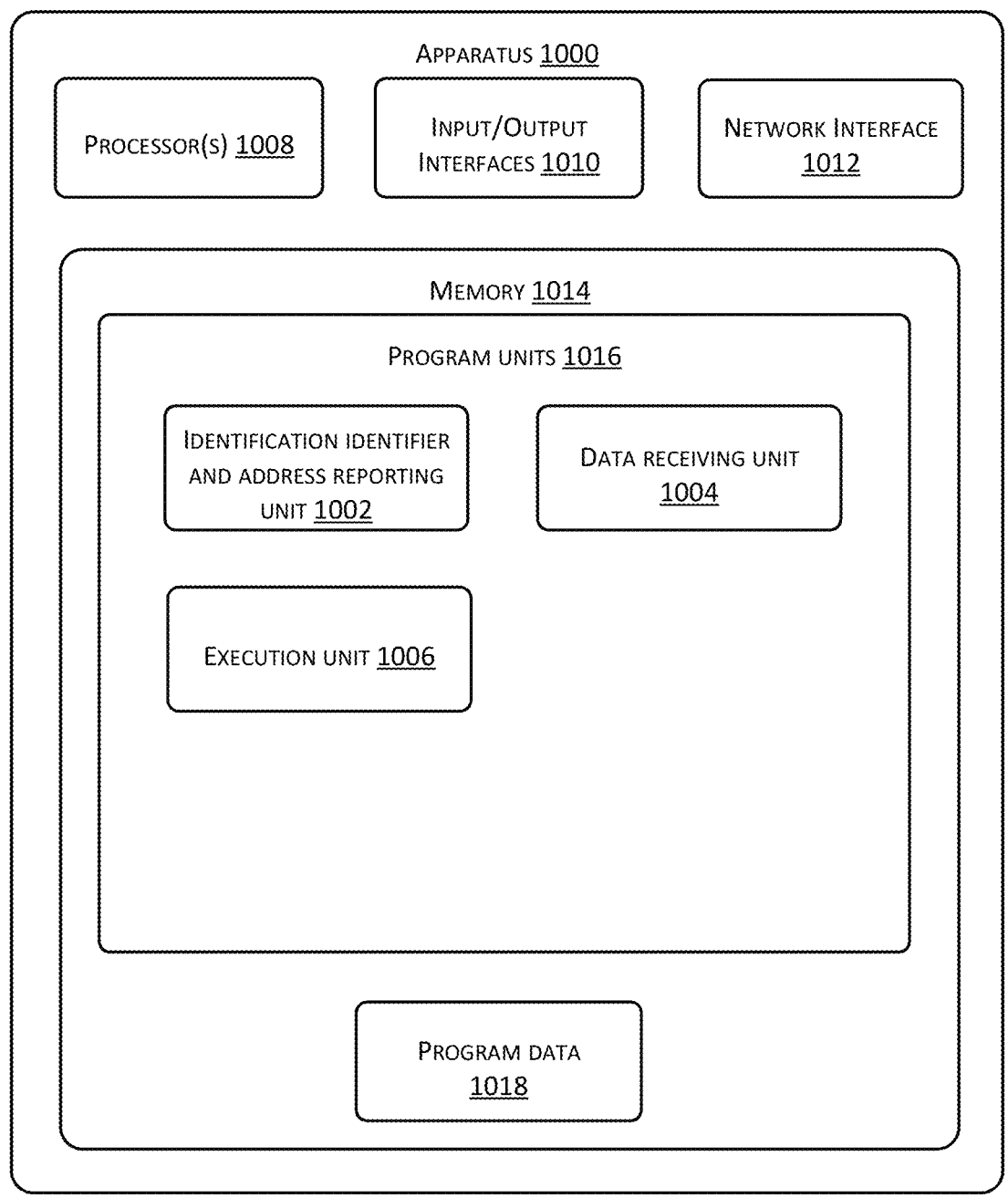
FIG. 10 is a schematic diagram of an apparatus for requesting trusted service management provided by the embodiments of the present disclosure.

FIG. 10 shows a schematic diagram of an apparatus 1000 for requesting trusted service management provided by the present disclosure. Since apparatus embodiments are basically similar to the method embodiments, a description thereof is relatively simple. Relevant parts can be referenced to corresponding descriptions of the method embodiments. The apparatus embodiments described below are only schematic.

The present disclosure provides an apparatus 1000 for requesting trusted service management, which includes:

an identification identifier and address reporting unit 1002 configured to report address information and an identification identifier of a computing unit;

a data receiving unit 1004 configured to identify and obtain a matching data packet according to the identification identifier from a received data packet, and parse out trusted service data from the data packet; and an execution unit 1006 configured to execute an instruction included in the trusted service data and return an execution result.

In implementations, the method for requesting trusted service management is performed based on a computing unit, wherein the computing unit is a secure element or a secure device embedded with a secure element.

In implementations, the received data message is a received broadcast data message, wherein the broadcast data message is a data message broadcasted by a gateway accessed by the computing unit.

In implementations, the trusted service data is APDU data specified by a global platform.

In implementations, the identification identifier is CPLC information of a secure element.

In implementations, the address information is a MAC and/or an IP of the secure element or the secure device.

In implementations, the identification identifier and address reporting unit 1002 is configured to perform the following processing before reporting the identification identifier:

receiving a message that queries whether it is a computing unit; and reporting the identification of the computing unit if affirmative.

In implementations, the data receiving unit 1004 is further configured to:

allow the secure device to recognize and obtain the matching data packet from the received broadcast data message according to the identification identifier thereof.

In implementations, the execution unit 1006 is further configured to:

communicate, within the secure device, with the secure element embedded in the secure device according to APDU data;

decrypt the APDU data through the secure element, execute an APDU instruction obtained after decryption, and encrypt the execution result to form state report APDU data; and report the state report APDU data to the gateway through the secure device, and further return the state report APDU data to a server that provides the trusted service through the gateway.

In implementations, the execution unit 1006 is also further configured to:

decrypt the APDU data by the computing unit, execute an APDU instruction obtained after decryption, and encrypt the execution result to form state report APDU data; and send the state report APDU data back to the gateway, and then return the state report APDU data to a server that provides the trusted service through the gateway.

In implementations, the corresponding APDU instruction included in the APDU data includes any of the following:

an instruction for creating a security domain APDU provided by a SEI-TSM server;

an application program APDU delivered by the SP-TSM; or personalized data APDU provided by the SP-TSM.

In implementations, the apparatus 1000 may further include one or more processors 1008, an input/output (I/O) interface 1010, a network interface 1012, and a memory 1014. In implementations, the memory 1014 may include program units 1016 and program data 1018. The program units 1016 may include one or more of the foregoing units and/or sub-units as described in FIG. 10.

In implementations, the memory 1014 may include a form of computer readable media as described in the foregoing description.

Figure 11:
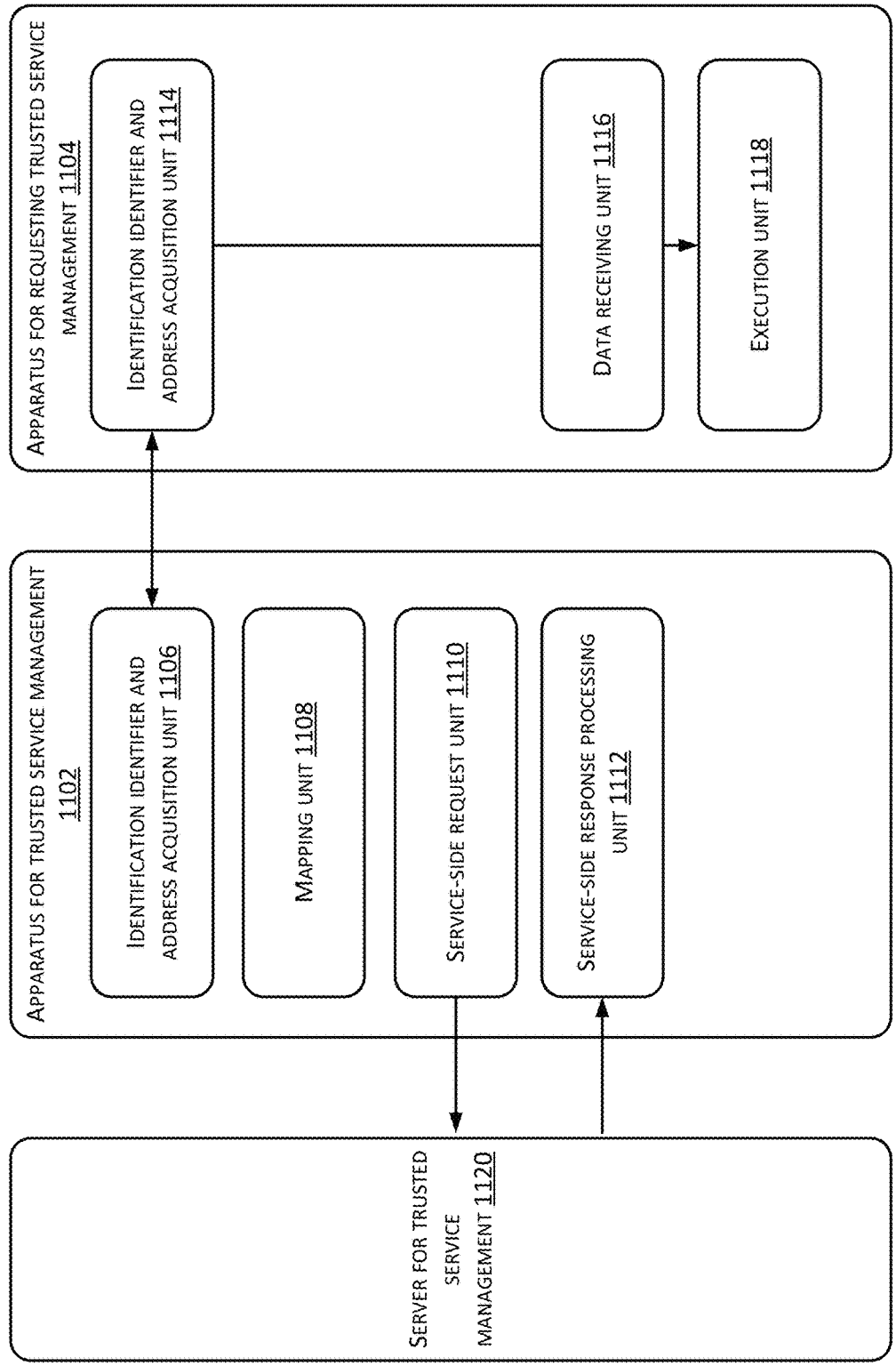
FIG. 11 is a schematic diagram of a trusted service system provided by the embodiments of the present disclosure.

The embodiments of the present disclosure further provide a trusted service system. As shown in FIG. 11, a trusted service system 1100 may include an apparatus for trusted service management 1102 and an apparatus for requesting trusted service management 1104 as described in the foregoing embodiments. The apparatus 1102 for trusted service management is usually deployed with a WiFi gateway device, but is not limited to a WiFi gateway, and may be any device that can implement the method for trusted service management. The apparatus 1104 for requesting trusted service management is usually deployed in a mobile phone, but is not limited to the mobile phone, and may be any device that can implement the method for requesting trusted service management, such as a portable terminal with an SE chip, an Internet of Things terminal with an SE chip, etc.

The apparatus 1102 for trusted service management includes:

an identification identifier and address acquisition unit 1106 configured to obtain an identification identifier and address information of a computing unit;

a mapping unit 1108 configured to obtain a mapping table for the identification identifier and the address information of the computing unit;

a service-side request unit 1110 configured to initiate a trusted service request message to a server that provides trusted service management using the identification identifier of the computing unit; and a service-side response processing unit 1112 configured to receive a corresponding trusted service response message, and transmit the trusted service response message to the computing unit according to the mapping table;

The apparatus 1104 for requesting trusted service management includes:

an identification identifier and address reporting unit 1114 configured to report the address information and the identification identifier of the computing unit;

a data receiving unit 1116 configured to identify and obtain a matching data packet according to the identification identifier from a received data packet, and parse out trusted service data from the data packet; and an execution unit 1118 configured to execute an instruction included in the trusted service data and return an execution result, wherein the computing unit is a secure element or a secure device embedded with a secure element.

For example, the apparatus 1102 for trusted service management is deployed in a WiFi gateway, and is able to obtain a MAC of the computing unit and a CPLC of a SE in the computing unit, establish a mapping table (mapping) of the MAC, an IP and the CPLC inside the gateway, and use the CPLC of the SE as an ID to initiate a request to TSM, for example, triggering an air card issuing process, assemble a broadcast data packet from the APDU responses received from the TSM gateway according to a packaging protocol, and perform broadcasting according to correspondence relationships among MACs, IPs and CPLCs. The apparatus 1104 for requesting trusted service management is deployed in a mobile phone with a SE chip, and is able to pick up a part that is consistent with its own CPLC from a data packet according to the CPLC after receiving data from broadcasting, parse out a corresponding APDU instruction therefrom, and communicate between the mobile phone and a SE. The SE chip decrypts the APDU and executes the obtained instruction, encrypt an execution result to form state report data in an APDU format, and return the state report data to the mobile phone. The mobile phone forwards the data to the WiFi gateway, and the WiFi gateway then separately performs forwarding to a TSM server 1120 according to a corresponding CPLC.

In a typical configuration, a computing device includes one or more processors (CPUs), input/output interfaces, network interfaces, and memory.

The memory may include a form of computer readable media such as a volatile memory, a random access memory (RAM) and/or a non-volatile memory, for example, a read-only memory (ROM) or a flash RAM. The memory is an example of a computer readable media.

1. The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

2. One skilled in the art should understand that the embodiments of the present disclosure may be provided as methods, systems, or computer program products. Therefore, the present disclosure may take a form of an entirely hardware embodiment, an entirely software embodiment, or an embodiment that is a combination of software and hardware. Moreover, the present disclosure may take a form of a computer program product implemented on one or more computer usable storage media (which includes, but are not limited to a magnetic storage device, a CD-ROM, an optical storage device, etc.) including computer usable program codes.

Although the present disclosure is disclosed above using exemplary embodiments, they are not intended to limit the present disclosure. Any person skilled in the art can make possible changes and modifications without departing from the spirit and scope of the present disclosure. The scope of protection of the present disclosure shall be subject to the scope defined in the claims of the present disclosure.

The present disclosure can further be understood using the following clauses.

Clause 1: A method for trusted service management, comprising: obtaining an identification identifier and address information of a computing unit; obtaining a mapping table for the identification identifier and the address information of the computing unit; initiating a trusted service request message to a server that provides trusted service management using the identification identifier of the computing unit; and receiving a corresponding trusted service response message, and transmitting the trusted service response message to the computing unit according to the mapping table.

Clause 2: The method for trusted service management of Clause 1, wherein the method for trusted service management is performed based on a gateway.

Clause 3: The method for trusted service management of Clause 1, wherein the gateway is a WIFI gateway.

Clause 4: The method for trusted service management of Clause 2, wherein the computing unit is a secure element or a secure device embedded with a secure element.

Clause 5: The method for trusted service management of Clause 4, further comprising: receiving an execution result returned by the computing unit, and sending the execution result to the server that provides the trusted service management.

Clause 6: The method for trusted service management of Clause 5, wherein transmitting the trusted service response message to the computing unit comprises: transmitting the trusted service response message to the computing unit in a broadcast mode.

Clause 7: The method for trusted service management of Clause 6, wherein the identification identifier is a production life cycle (CPLC) of a secure element of the computing unit.

Clause 8: The method for trusted service management of Clause 4, wherein the address information is a MAC and/or an IP of the secure element or the secure device.

Clause 9: The method for trusted service management of Clause 8, wherein obtaining the identification identifier and the address information of the computing unit comprises the following processing: receiving a request from a requesting party, and performing an operation of connection and gateway authentication on the requesting party; recording address information of the requesting party is and querying whether the requesting party is a secure element or a secure device if the authentication is passed; sending a request for obtaining the identification identifier of the computing unit if affirmative; and receiving and obtaining the identification identifier of the computing unit.

Clause 10: The method for trusted service management of Clause 7, wherein: if the address information is a MAC and/or an IP of the secure element or the secure device, the mapping table comprises any one of the following correspondence relationships: a correspondence relationship between CPLC and MAC, a correspondence relationship between CPLC and IP, a correspondence relationship among CPLC, MAC and IP.

Clause 11: The method for trusted service management of Clause 10, wherein the computing unit is a secure element or a secure device that is able to recognize APDU data specified by a global platform and execute APDU instructions.

Clause 12: The method for trusted service management of Clause 11, wherein transmitting the response message to the computing unit in the broadcast mode comprises the following processing: assembling the response message into a broadcast data message according to a packaging protocol; and broadcasting the broadcast data message according to the mapping table, wherein the packaging protocol includes at least relevant information of the following fields: packet header information and APDU data.

Clause 13: The method for trusted service management of Clause 12, wherein the packet header information comprises at least the following fields: the identification identifier and a length.

Clause 14: The method for trusted service management of Clause 12, wherein the packaging protocol comprises any of the following fields: reserved bits and a state.

Clause 15: The method for trusted service management of Clause 12, wherein the broadcast data message comprises one or more data packets assembled according to the packaging protocol.

Clause 16: The method for trusted service management of Clause 11, wherein the APDU data comprises at least any of the following content information: life cycle management information, rights management information, key escrow information, authentication information, secure data transmission and processing information, sensitive personal data, and state report information.

Clause 17: The method for trusted service management of Clause 12, wherein the server that provides the trusted service management is a SEI-TSM server, and wherein the SEI-TSM is a trusted management end that issues secure elements.

Clause 18: The method for trusted service management of Clause 17, wherein: when the trusted service request message is a security domain creating request APDU, the trusted service response message is a security domain creating instruction APDU.

Clause 19: The method for trusted service management of Clause 18, wherein when the execution result returned by the computing unit is a successful creation of a security domain, after receiving the successful creation of the security domain returned by the computing unit, the method further comprises the following processing: initiating an application download request to a SP-TSM using the identification identifier of the computing unit, wherein the SP-TSM is a server of a service provider of the trusted service management.

Clause 20: The method for trusted service management of Clause 19, wherein when the trusted service request message is an application download request, the corresponding trusted service response message comprises: an APDU formed by assembling and encrypting an application program requested to be downloaded by the SP-TSM, wherein, the APDU is packaged into a broadcast data packet by a gateway according to the packaging protocol, and is sent out in a broadcast form.

Clause 21: The method for trusted service management of Clause 20, wherein: when the execution result returned by the computing unit is an application installation state report APDU, after a gateway receives the execution result returned by the computing unit, the method further comprises the following processing: returning the state report APDU to SP-TSM.

Clause 22: The method for trusted service management of Clause 21, wherein: when the execution result returned by the computing unit is the application installation state report APDU, after the gateway returns the state report APDU to the SP-TSM, the method further comprises the following processing: sending a personalized request by the gateway to the SP-TSM using the identification identifier of the computing unit, wherein the SP-TSM obtains personalized data according to the personalized request and sends the personalized data to the gateway in an APDU data format, and the gateway collects data and assembles into a broadcast packet, which is broadcasted to the computing unit according to the mapping table.

Clause 23: The method for trusted service management of Clause 1, wherein initiating the trusted service request message to the server that provides the trusted service management comprises transparently transmitting the received trusted service request message that is initiated by the computing unit.

Clause 24: The method for trusted service management of Clause 1, wherein initiating the trusted service request message to the server that provides the trusted service management using the identification identifier of the computing unit comprises initiating the trusted service request message in real-time or in a batch manner.

Clause 25: A method for requesting trusted service management, comprising: reporting address information and identification identifier of a computing unit; identifying and obtaining a matching data packet according to the identification identifier from a received data message, and parsing out trusted service data from the data packet; and executing an instruction included in the trusted service data, and returning an execution result.

Clause 26: The method for requesting trusted service management of Clause 25, wherein the method for requesting trusted service management is performed based on the computing unit, and wherein the computing unit is a secure element or a secure device embedded with a secure element.

Clause 27: The method for requesting trusted service management of Clause 26, wherein the received data message is a received broadcast data message, and wherein the broadcast data message is a data message broadcasted by a gateway accessed by the computing unit.

Clause 28: The method for requesting trusted service management of Clause 26, wherein the trusted service data is APDU data specified by a global platform.

Clause 29: The method for requesting trusted service management of Clause 26, wherein the identification identifier is CPLC information of a secure element.

Clause 30: The method for requesting trusted service management of Clause 26, wherein the address information is a MAC and/or an IP of the secure element or the secure device.

Clause 31: The method for requesting trusted service management of Clause 26, wherein: before reporting the identification identifier, the method comprises: receiving a message that queries whether it is a computing unit; and reporting the identification of the computing unit if affirmative.

Clause 32: The method for requesting trusted service management of Clause 27, wherein identifying and obtaining the matching data packet according to the identification identifier from the received data packet comprises the following processing: recognizing and obtaining, by the secure device, the matching data packet from the received broadcast data message according to the identification identifier thereof.

Clause 33: The method for requesting trusted service management of Clause 28, wherein executing the instruction included in the trusted service data, and returning the execution result comprise: communicating, within the secure device, with the secure element embedded in the secure device according to APDU data; decrypting the APDU data through the secure element, executing an APDU instruction obtained after decryption, and encrypting the execution result to form state report APDU data; and reporting the state report APDU data to the gateway through the secure device, and further returning the state report APDU data to a server that provides the trusted service through the gateway.

Clause 34: The method for requesting trusted service management of Clause 28, wherein executing a corresponding APDU instruction included in the APDU data, and returning the execution result include the following processing: decrypting the APDU data by the computing unit, executing the APDU instruction obtained after decryption, and encrypting the execution result to form state report APDU data; and sending the state report APDU data back to the gateway, and then returning the state report APDU data to a server that provides the trusted service through the gateway.

Clause 35: The method for requesting trusted service management of Clause 28, wherein a corresponding APDU instruction included in the APDU data includes any of the following: an instruction for creating a security domain APDU provided by a SEI-TSM server; an application program APDU delivered by the SP-TSM; or personalized data APDU provided by the SP-TSM.

Clause 36: An apparatus for trusted service management, comprising: an identification identifier and address acquisition unit configured to obtain an identification identifier and address information of a computing unit; a mapping unit configured to obtain a mapping table for the identification identifier and the address information of the computing unit; a service-side request unit configured to initiate a trusted service request message to a server that provides trusted service management using the identification identifier of the computing unit; and a service-side response processing unit configured to receive a corresponding trusted service response message, and transmit the trusted service response message to the computing unit according to the mapping table.

Clause 37: An apparatus for requesting trusted service management, comprising: an identification identifier and address reporting unit configured to report address information and an identification identifier of a computing unit; a data receiving unit configured to identify and obtain a matching data packet according to the identification identifier from a received data packet, and parse out trusted service data from the data packet; and an execution unit configured to execute an instruction included in the trusted service data and return an execution result.

Clause 38: A trusted service system, comprising: an apparatus for trusted service management; and an apparatus for requesting trusted service management, wherein: the apparatus for trusted service management comprises: an identification identifier and address acquisition unit configured to obtain an identification identifier and address information of a computing unit; a mapping unit configured to obtain a mapping table for the identification identifier and the address information of the computing unit; a service-side request unit configured to initiate a trusted service request message to a server that provides trusted service management using the identification identifier of the computing unit; and a service-side response processing unit configured to receive a corresponding trusted service response message, and transmit the trusted service response message to the computing unit according to the mapping table; the apparatus for requesting trusted service management comprises: an identification identifier and address reporting unit configured to report the address information and the identification identifier of the computing unit; a data receiving unit configured to identify and obtain a matching data packet according to the identification identifier from a received data packet, and parse out trusted service data from the data packet; and an execution unit configured to execute an instruction included in the trusted service data and return an execution result.

What is claimed is:

1. A method implemented by a computing device, the method comprising:
obtaining an identification identifier and address information of a computing unit;
obtaining a mapping table for the identification identifier and the address information of the computing unit;
initiating a trusted service request message to a server that provides a trusted service management using the identification identifier of the computing unit; and
receiving a corresponding trusted service response message, and transmitting the trusted service response message to the computing unit according to the mapping tables wherein when the trusted service request message is an application download request, the corresponding trusted service response message comprises: an Application Protocol Data Unit (APDU) formed by assembling and encrypting an application program requested to be downloaded by a Service Provider Trusted Service Management (SP-TSM), and wherein the APDU is packaged into a broadcast data packet by a gateway according to a packaging protocol, and is sent out in a broadcast form.

2. The method of claim 1, wherein the computing unit comprises a secure element or a secure device embedded with the secure element.

3. The method of claim 2, further comprising: receiving an execution result returned by the computing unit, and sending the execution result to the server that provides the trusted service management.

4. The method of claim 3, wherein: when the execution result returned by the computing unit is a successful creation of a security domain, the method further comprises: initiating an application download request to the SP-TSM using the identification identifier of the computing unit after receiving the successful creation of the security domain returned by the computing unit, wherein the SP-TSM is a server of a service provider of the trusted service management.

5. The method of claim 3, wherein: when the execution result returned by the computing unit is an application installation state report APDU, the method further comprises: returning a state report APDU to the SP-TSM after receiving the execution result returned by the computing unit.

6. The method of claim 5, further comprising: sending a personalized request to the SP-TSM using the identification identifier of the computing unit after the state report APDU is returned to the SP-TSM, wherein the SP-TSM obtains personalized data according to the personalized request and sends the personalized data to the computing device in an APDU data format, and the computing device collects and assembles pieces of data into a broadcast packet, which is broadcasted to the computing unit according to the mapping table.

7. The method of claim 1, wherein initiating the trusted service request message to the server that provides the trusted service management comprises transparently transmitting the received trusted service request message that is initiated by the computing unit.

8. The method of claim 1, wherein initiating the trusted service request message to the server that provides the trusted service management using the identification identifier of the computing unit comprises initiating the trusted service request message in real-time or in a batch manner.

9. The method of claim 1, wherein transmitting the trusted service response message to the computing unit in the broadcast mode comprises:
   assembling the trusted service response message into a broadcast data message according to the packaging protocol; and
   broadcasting the broadcast data message according to the mapping table, wherein the packaging protocol includes at least relevant information of: packet header information and APDU data.

10. The method of claim 9, wherein: if the address information is a Media Access Control (MAC) and/or an Internet Protocol (IP) of a secure element or a secure device, the mapping table comprises one of: a correspondence relationship between a production life cycle (CPLC) and the MAC, a correspondence relationship between the CPLC and the IP, a correspondence relationship among the CPLC, the MAC and the IP.

11. The method of claim 1, wherein the identification identifier comprises a production life cycle (CPLC) of a secure element of the computing unit, and the address information comprises one or more of: a Media Access Control (MAC) or an Internet Protocol (IP) of the secure element or a secure device.

12. The method of claim 1, wherein obtaining the identification identifier and the address information of the computing unit comprises:
   receiving a request from a requesting party, and performing an operation of connection and gateway authentication on the requesting party;
   recording address information of the requesting party and querying whether the requesting party is a secure element or a secure device if the gateway authentication is passed;
   sending a request for obtaining the identification identifier of the computing unit if the requesting party is the secure element or the secure device; and
   receiving and obtaining the identification identifier of the computing unit.

13. One or more non-transitory computer readable media storing executable instructions that, when executed by one or more processors of a computing unit, cause the one or more processors to perform acts comprising:
   reporting address information and identification identifier of the computing unit;
   identifying and obtaining a matching data packet according to the identification identifier from a received data message, and parsing out trusted service data from the matching data packet; and
   executing an instruction included in the trusted service data, and returning an execution result, wherein executing the instruction included in the trusted service data, and returning the execution result comprise:
      communicating with a secure element embedded in a secure device according to Application Protocol Data Unit (APDU) data;
      decrypting the APDU data through the secure element, executing an APDU instruction obtained after decryption, and encrypting the execution result to form state report APDU data; and
      reporting the state report APDU data to a gateway through the secure device, and returning the state report APDU data to a server that provides a trusted service through the gateway.

14. The one or more non-transitory computer readable media of claim 13, wherein the computing unit further comprises the secure element or the secure device embedded with the secure element.

15. The one or more non-transitory computer readable media of claim 14, wherein the received data message is a received broadcast data message, and wherein the received broadcast data message is a data message broadcasted by the gateway accessed by the computing unit.

16. The one or more non-transitory computer readable media of claim 15 wherein identifying and obtaining the matching data packet according to the identification identifier from the received data message comprises: recognizing and obtaining the matching data packet from the received broadcast data message according to the identification identifier.

17. An apparatus comprising:
   one or more processors:
   a memory;
   an identification identifier and address acquisition unit stored in the memory and executed by the one or more processors to obtain an identification identifier and address information of a computing unit;
   a mapping unit stored in the memory and executed by the one or more processors to obtain a mapping table for the identification identifier and the address information of the computing unit;
   a service-side request unit stored in the memory and executed by the one or more processors to initiate a trusted service request message to a server that provides trusted service management using the identification identifier of the computing unit; and a service-side response processing unit stored in the memory and executed by the one or more processors to receive a corresponding trusted service response message, and transmit the trusted service response message to the computing unit according to the mapping table and an execution result processing unit stored in the memory and executed by the one or more processors to:
receive an execution result returned by the computing unit,
send the execution result to the server that provides the trusted service management, and
when the execution result returned by the computing unit is an application installation state report Application Protocol Data Unit (APDU), return a state report APDU to a Service Provider Trusted Service Management (SP-TSM) after receiving the execution result returned by the computing unit.

\* \* \* \* \*